United States Patent
Kasuya

(10) Patent No.: US 10,841,445 B2
(45) Date of Patent: Nov. 17, 2020

(54) MULTIFUNCTION PERIPHERAL CAPABLE OF PROPERLY EXECUTING A PLURALITY OF PROCESSES, METHOD OF CONTROLLING SAME, AND STORAGE MEDIUM

(71) Applicant: CANON KABUSHIKI KAISHA, Tokyo (JP)

(72) Inventor: Kenji Kasuya, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/503,669

(22) Filed: Jul. 5, 2019

(65) Prior Publication Data
US 2020/0021703 A1 Jan. 16, 2020

(30) Foreign Application Priority Data
Jul. 11, 2018 (JP) .................................. 2018-131634

(51) Int. Cl.
*H04N 1/00* (2006.01)
*H04N 1/32* (2006.01)

(52) U.S. Cl.
CPC ..... *H04N 1/00652* (2013.01); *H04N 1/00411* (2013.01); *H04N 1/00427* (2013.01);
(Continued)

(58) Field of Classification Search
CPC ....... H04N 2201/0094; H04N 1/00204; H04N 1/00209; H04N 1/00244; H04N 1/00416;
(Continued)

(56) References Cited

U.S. PATENT DOCUMENTS 5,327,156 A * 7/1994 Masukane .............. G09G 5/395
345/547
5,630,032 A * 5/1997 Yamaguchi ............... G06F 3/12
358/1.16
(Continued)

FOREIGN PATENT DOCUMENTS

EP 2237163 A1 10/2010
JP H05336385 A 12/1993
(Continued)

OTHER PUBLICATIONS

Copending U.S. Appl. No. 16/503,665, filed Jul. 5, 2019.
(Continued)

*Primary Examiner* — Negussie Worku
(74) *Attorney, Agent, or Firm* — Rossi, Kimms & McDowell LLP

(57) ABSTRACT

A multifunction peripheral that is capable of performing, in parallel, a plurality of processes including a scanning process on an original using a scanner section. A RAM holds image data generated by the scanner section. A scanner transfer section transfers data from the scanner section to the RAM. A transfer rate of data from the scanner section to the RAM is set by switching at least between a first transfer rate and a second transfer rate lower than the first transfer rate. In a case where a plurality of processes including the scanning process are executed in parallel, a data transfer rate is switched by switching the data transfer rate based on a user's operation performed on a console section.

12 Claims, 17 Drawing Sheets

(52) U.S. Cl.
CPC ..... *H04N 1/00482* (2013.01); *H04N 1/32448* (2013.01); *H04N 1/32673* (2013.01); *H04N 2201/0094* (2013.01)

(58) Field of Classification Search
CPC ......... H04N 1/00973; H04N 2201/001; H04N 2201/0039; H04N 1/00212; H04N 1/00307; H04N 1/00315; H04N 1/00408; H04N 1/00411; H04N 1/04; H04N 1/0001; H04N 1/00; G06F 3/1231; G06F 3/1238; G06F 3/1236; G06F 3/1232; G06F 3/1258
USPC ........................................ 358/1.15, 442, 443
See application file for complete search history.

(56) References Cited

U.S. PATENT DOCUMENTS

| | | | | |
|---|---|---|---|---|
| 5,631,701 | A * | 5/1997 | Miyake | H04N 1/2112 348/222.1 |
| 8,120,807 | B2 | 2/2012 | Honma | |
| 9,530,085 | B2 | 12/2016 | Yamamoto | |
| 9,571,694 | B2 | 2/2017 | Hirao | |
| 10,277,770 | B2 | 4/2019 | Hirao | |
| 2001/0022671 | A1 | 9/2001 | Itoh | |
| 2002/0071104 | A1* | 6/2002 | Silverbrook | B41J 2/1643 355/18 |
| 2003/0033368 | A1* | 2/2003 | Tominaga | H04N 1/00427 709/203 |
| 2004/0213482 | A1* | 10/2004 | Silverbrook | B41J 15/044 382/312 |
| 2005/0099660 | A1* | 5/2005 | Yada | H04N 1/32593 358/498 |
| 2005/0206973 | A1* | 9/2005 | Shoji | H04N 1/33315 358/500 |
| 2005/0264691 | A1* | 12/2005 | Endo | H04N 7/012 348/446 |
| 2007/0070410 | A1* | 3/2007 | Suzuki | H04N 1/00204 358/1.15 |
| 2008/0204768 | A1* | 8/2008 | Ikuno | H04N 1/00941 358/1.1 |
| 2008/0239380 | A1 | 10/2008 | Takahashi | |
| 2010/0271667 | A1* | 10/2010 | Nakata | H04N 1/00795 358/406 |
| 2011/0216375 | A1* | 9/2011 | Suzuki | H04N 1/00 358/401 |
| 2012/0287444 | A1* | 11/2012 | Osada | H04N 1/00068 358/1.2 |
| 2013/0007078 | A1 | 1/2013 | Wegener | |
| 2013/0050742 | A1 | 2/2013 | Ward | |
| 2013/0198507 | A1* | 8/2013 | Kasuya | G06F 1/24 713/100 |
| 2015/0055160 | A1 | 2/2015 | Ito | |
| 2015/0358503 | A1 | 12/2015 | Hirao | |
| 2016/0173728 | A1* | 6/2016 | Kasuya | H04N 1/32496 358/1.14 |
| 2016/0210543 | A1 | 7/2016 | Yamamoto | |
| 2017/0223222 | A1* | 8/2017 | Yasunaga | G06K 15/1836 |
| 2018/0063356 | A1 | 3/2018 | Hirao | |
| 2019/0196763 | A1 | 6/2019 | Kubo | |
| 2020/0021703 | A1* | 1/2020 | Kasuya | H04N 1/00482 |

FOREIGN PATENT DOCUMENTS

| | | |
|---|---|---|
| JP | 2009124316 A | 6/2009 |
| JP | 2013153521 A | 8/2013 |
| JP | 2015231219 A | 12/2015 |
| JP | 2016133855 A | 7/2016 |
| JP | 2018033087 A | 3/2018 |

OTHER PUBLICATIONS

Extended European Search Report issued in EP Appln. No. 19184620.3 dated Nov. 21, 2019.

Combined Search and Examination Report issued in GB Appln. No. 1909683.3 dated Nov. 25, 2019.

Office Action issued in Japanese Appln. No. 2018-131632 dated Mar. 17, 2020.

Office Action issued in U.S. Appl. No. 16/503,665 dated Apr. 1, 2020.

Office Action issued in U.S. Appl. No. 16/503,665 dated Aug. 26, 2020.

* cited by examiner

MULTIFUNCTION PERIPHERAL CAPABLE OF PROPERLY EXECUTING A PLURALITY OF PROCESSES, METHOD OF CONTROLLING SAME, AND STORAGE MEDIUM

BACKGROUND OF THE INVENTION

Field of the Invention

The present invention relates to a multifunction peripheral that is capable of properly executing a plurality of processes, a method of controlling the same, and a storage medium.

Description of the Related Art

For example, a multifunction peripheral includes a scanner section, an image processor, a printer section, and a communication section.

The multifunction peripheral scans an original, prints image data, and performs facsimile communication by combining processes performed by the sections and processor.

For example, in a case where an image of an original is copied to a sheet, first, the multifunction peripheral reads the original, and transfers image data of the read original to an image memory using the scanner section. Next, the multifunction peripheral converts the image data in the image memory to data for printing using the image processor. Next, the multifunction peripheral prints the converted image data in the image memory on a sheet using the printer section.

Incidentally, the processing capability per unit time is important for the multifunction peripheral, and it is envisaged to increase the speed of the scanning process so as to improve the processing capability. By increasing the speed of the scanning process, it is possible to complete the scanning process in a short time to thereby quickly free the user from the job.

In a controller described in Japanese Laid-Open Patent Publication (Kokai) No. 2013-153521, the resolution for reading an original is changed according to the format of a file to be generated. In this case, the speed of low-resolution scanning can be made higher than the speed of high-resolution scanning.

However, if the speed of the scanning process of the multifunction peripheral is increased, the load of data transfer from the scanner section to the image memory is increased. This may make it difficult for the multifunction peripheral increased in the speed of the scanning process to perform another process in parallel with the scanning process. Further, if the amount of data transfer exceeds the data transfer capacity of an image bus to which the image memory is connected, the multifunction peripheral cannot normally execute image processing.

Thus, the multifunction peripheral is required to be capable of properly executing a plurality of processes including the scanning process and enabling a user to be quickly freed from the job by increasing the speed of the scanning process performed by the scanner section.

SUMMARY OF THE INVENTION

The present invention provides a multifunction peripheral that is capable of properly executing a plurality of processes including a scanning process and enabling a user to be quickly freed from a job by increasing the speed of the scanning process performed by a scanner section, a method of controlling the same, and a storage medium.

In a first aspect of the present invention, there is provided a multifunction peripheral that is capable of performing a plurality of processes including a scanning process on an original using a scanner section, in parallel, comprising an image memory configured to hold image data generated by the scanner section, a transfer unit configured to transfer data from the scanner section to the image memory, a setting unit configured to set a transfer rate of data from the scanner section to the image memory by the transfer unit by switching the transfer rate at least between a first transfer rate and a second transfer rate lower than the first transfer rate, and a console unit that is operated by a user, wherein in a case where a plurality of processes including the scanning process are executed in parallel, the setting unit sets the transfer rate of data by switching the transfer rate of data based on a user's operation performed on the console unit.

In a second aspect of the present invention, there is provided a method of controlling a multifunction peripheral that is capable of performing a plurality of processes including a scanning process on an original using a scanner section, in parallel, comprising transferring image data generated by the scanner section, from the scanner section to an image memory configured to hold the image data generated by the scanner section, setting a transfer rate of data from the scanner section to the image memory, by switching the transfer rate at least between a first transfer rate and a second transfer rate lower than the first transfer rate, receiving a user's operation, and setting, in a case where a plurality of processes including the scanning process are executed in parallel, the transfer rate of data by switching the transfer rate of data based on the user's operation.

In a third aspect of the present invention, there is provided a non-transitory computer-readable storage medium storing a computer-executable program for executing a method of controlling a multifunction peripheral that is capable of performing a plurality of processes including a scanning process on an original using a scanner section, in parallel, wherein the method comprises transferring image data generated by the scanner section, from the scanner section to an image memory configured to hold the image data generated by the scanner section, setting a transfer rate of data from the scanner section to the image memory, by switching the transfer rate at least between a first transfer rate and a second transfer rate lower than the first transfer rate, receiving a user's operation, and setting, in a case where a plurality of processes including the scanning process are executed in parallel, the transfer rate of data by switching the transfer rate of data based on the user's operation.

According to the present invention, it is possible to properly execute a plurality of processes including the scanning process and enabling a user to be quickly freed from a job by increasing the speed of the scanning process performed by the scanner section.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof. However, the configuration described in the following embodiments is only an example, and the scope of the present invention is not limited to the configuration described in the embodiment.

Figure 1:
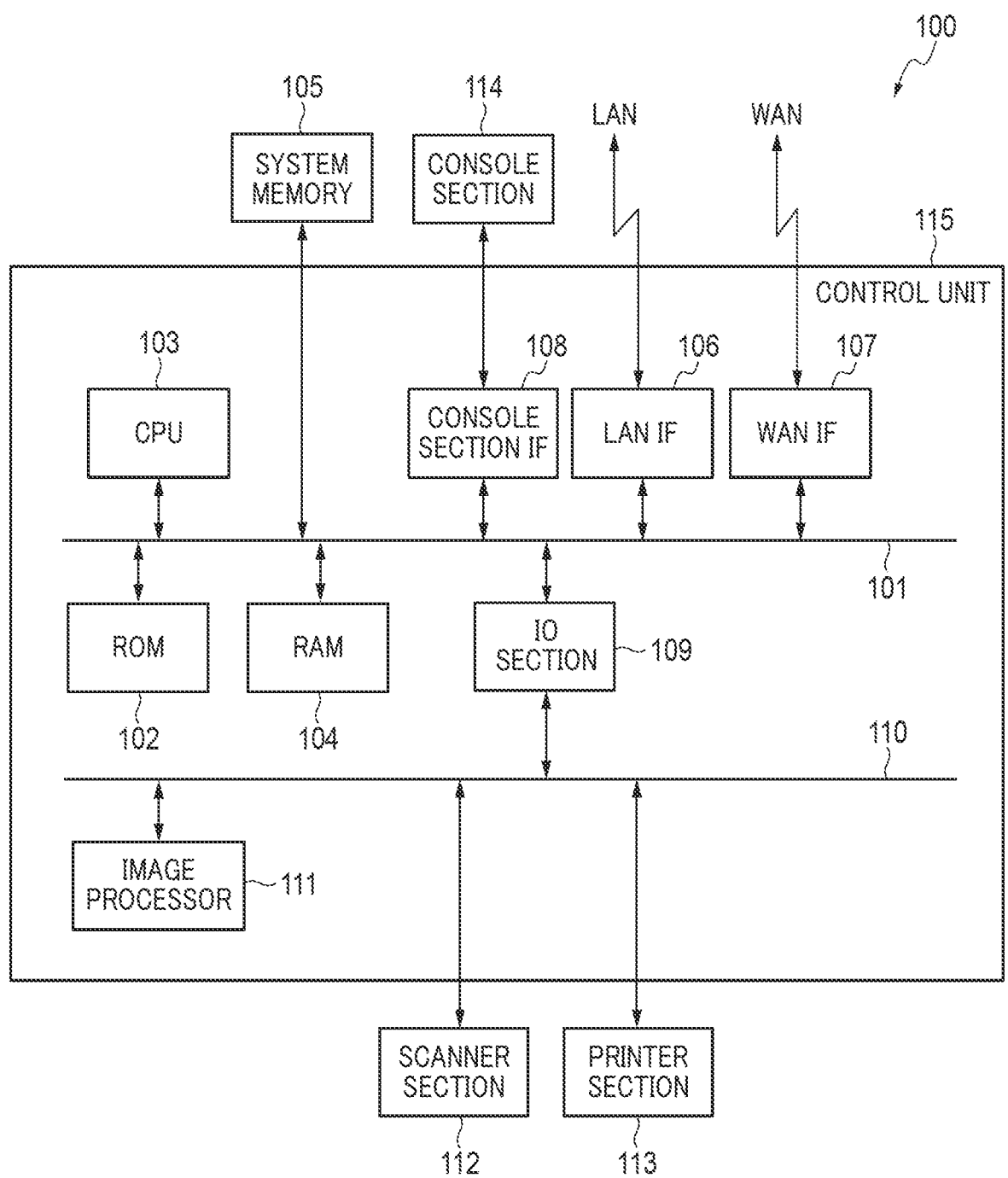
FIG. 1 is a schematic diagram of a multifunction peripheral according to a first embodiment of the present invention.

FIG. 1 is a schematic diagram of a multifunction peripheral 100 according to a first embodiment of the present invention.

The multifunction peripheral 100 shown in FIG. 1 includes a scanner section 112 that scans an original to generate image data, a printer section 113 that prints image data on a sheet, a console section 114, a control unit 115, and a system memory 105.

The console section 114 is a user interface, and includes an LCD touch panel, numeric keys, and so forth. The LCD touch panel displays a setting screen, and so forth. The LCD touch panel, numeric keys, and so forth, are operated by a user.

The control unit 115 includes two buses, a system bus 101 and an image bus 110.

A CPU 103, a ROM 102, a RAM 104, the system memory 105, a console section interface 108, a LAN interface 106, a WAN interface 107, and an IO section 109 are connected to the system bus 101.

A system boot program is recorded in the ROM 102.

The system memory 105 as a configuration memory is implemented by e.g. an HDD (hard disk drive) or an SSD (Solid State Drive).

System software programs, image data, and so forth, are recorded in the system memory 105. Note that the system software programs may be recorded in the ROM 102.

The RAM 104 is a system work memory area for the CPU 103 that executes the software.

The CPU 103 loads the programs recorded in the ROM 102 and the system memory 105 into the RAM 104, and executes the loaded programs. Thus, a controller of the multifunction peripheral 100 is realized.

Further, the CPU 103 may load image data into the RAM 104 and execute processing on the image data.

The IO section 109 is a bus bridge connecting between the system bus 101 and the image bus 110.

The IO section 109 generates a transfer enable clock signal for the image bus 110 from a clock signal delivered via the system bus 101 e.g. based on a setting of the CPU 103. Note that the transfer enable clock signal may be generated by a bus controller based on a setting of the CPU 103.

An image processor 111, the scanner section 112, the printer section 113, and the IO section 109 are connected to the image bus 110. The image bus 110 may be implemented by a general-purpose bus, such as a PCI bus, an IEEE 1394 bus, and a PCI-Ex bus, which can transfer image data at a high data transfer rate.

The image processor 111 performs various image processing operations, such as resolution conversion, compression/expansion, and binary-data/multi-valued data conversion, on image data. The image processor 111 may be formed by a plurality of ASICs (application specific integrated circuits) provided for respective types of the image processing.

The plurality of processing sections for processing image data, such as the image processor 111, the scanner section 112, and the printer section 113, perform data communication in synchronism with the transfer enable clock signal. The processing sections acquire image data for the associated processes via the image bus 110, and output the processed image data via the image bus 110.

The console section interface 108 is an interface connected to the console section 114 and controls the console section 114 by software. The console section interface 108 outputs image data to be displayed on the console section 114 to the console section 114.

Further, when information is input by a user's operation on the console section 114, the console section interface 108 outputs the input information to the CPU 103.

The LAN interface 106 is an interface connected to a LAN (local area network), for communication with another apparatus, such as a personal computer, connected to the LAN.

The WAN interface 107 is an interface connected to a WAN (wide area network), for communication with another apparatus connected to the \VAN, such as a management apparatus.

Figure 2:
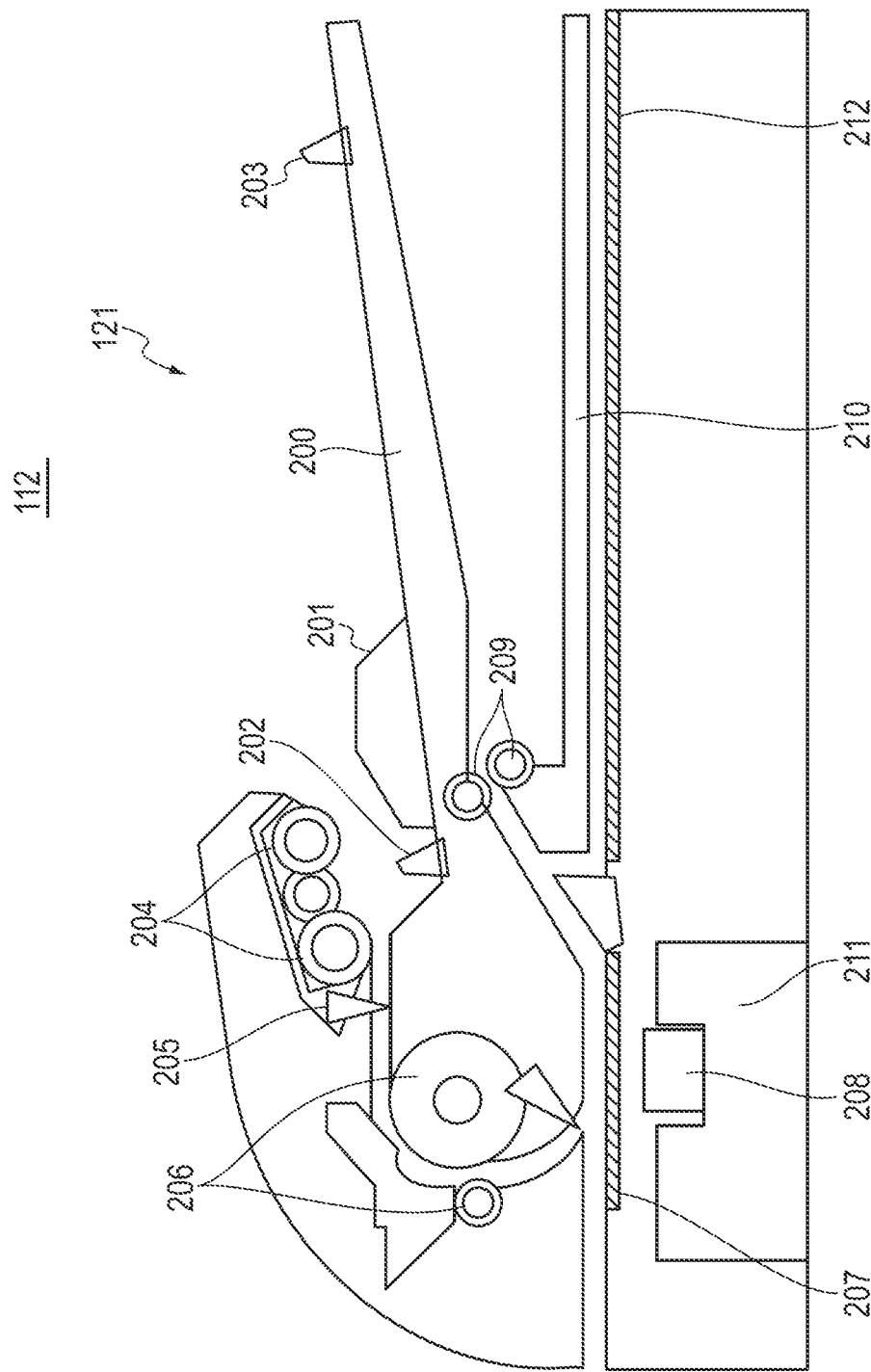
FIG. 2 is a schematic view useful in explaining the structure of a scanner section appearing in FIG. 1.

FIG. 2 is a schematic view useful in explaining the structure of the scanner section 112 appearing in FIG. 1.

The scanner section 112 shown in FIG. 2 includes a DF (document feeder) unit 121 arranged above a platen 212 of the multifunction peripheral 100, and a sensor unit 211 which can move in a sub scanning direction below the platen 212.

When in a home position thereof, the sensor unit 211 is positioned below a reading window 207 provided adjacent to the platen 212, as viewed in FIG. 2. The sensor unit 211 includes a CIS (contact image sensor) 208 which reads an original in a main scanning direction. The CIS 208 has a plurality of photoelectric conversion elements, such as CCDs, arranged along the main scanning direction.

The DF unit 121 conveys a plurality of originals placed on an original tray 200 to the reading window 207 one by one, and further conveys each original from the reading window 207 to a discharge tray 210. The DF unit 121 includes the original tray 200, a pair of original guides 201, a document sensor 202, an original size detection sensor 203, pickup rollers 204, an original passage detection sensor 205, conveying rollers 206, discharge rollers 209, and the discharge tray 210. The original guides 201 position the originals placed on the original tray 200 by sandwiching the originals therebetween. The document sensor 202 detects presence/absence of an original on the original tray 200. The pickup rollers 204 are driven by a stepping motor 306 (see FIG. 3) to deliver the originals placed on the original tray 200 to an original conveying path. The conveying rollers 206 are driven by the stepping motor 306 to convey each original conveyed to the original conveying path by the pickup rollers 204, to the reading window 207. The discharge rollers 209 are driven by the stepping motor 306 to convey each original having been conveyed by the conveying rollers 206 and passed the reading window 207 to the discharge tray 210. The original passage detection sensor 205 detects passage of each original being conveyed along the conveying path.

Figure 3:
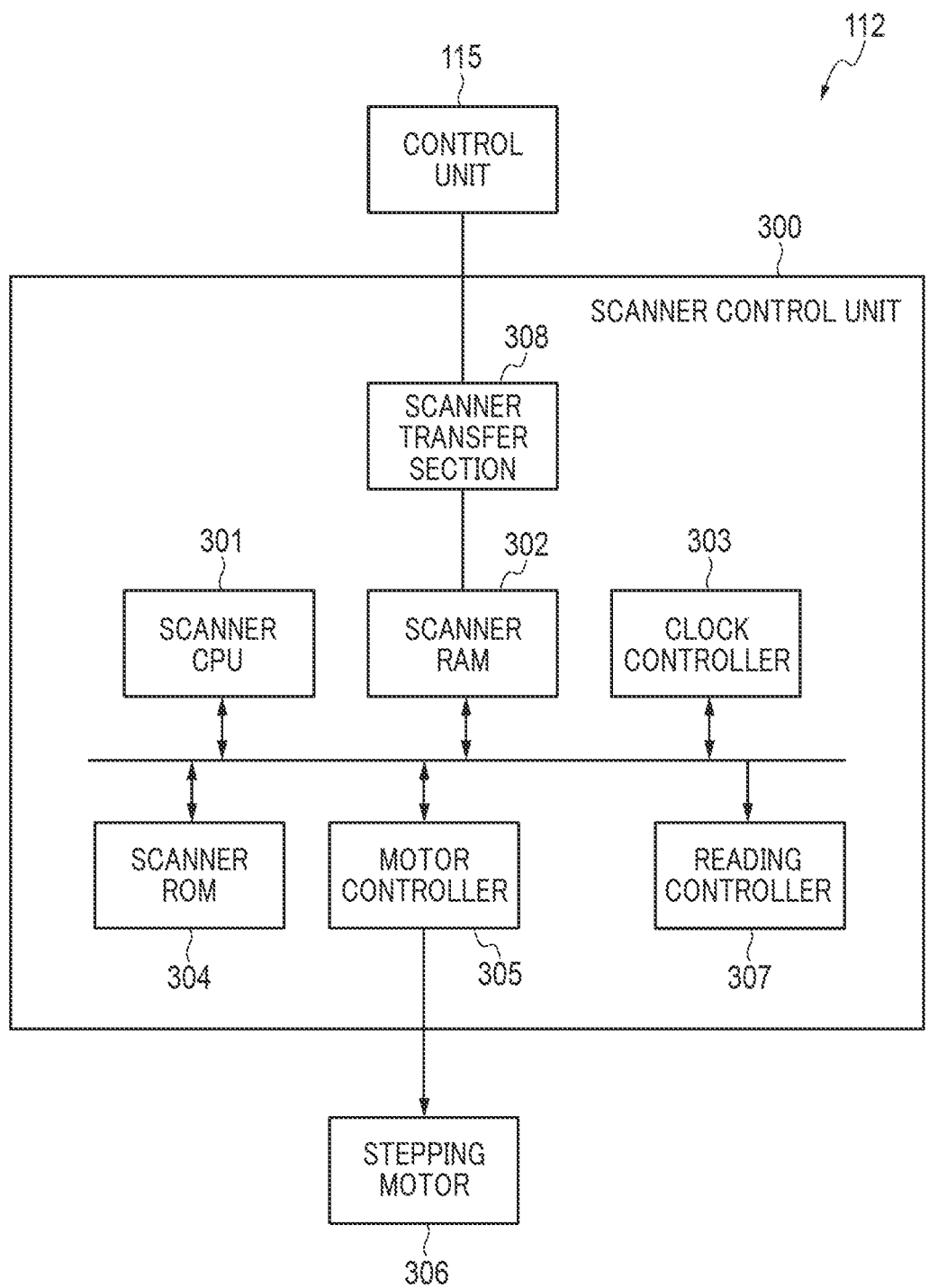
FIG. 3 is a diagram useful in explaining a control system of the scanner section appearing in FIG. 1.

FIG. 3 is a diagram useful in explaining a control system of the scanner section 112 appearing in FIG. 1.

The control system of the scanner section 112, shown in FIG. 3, includes a scanner control unit 300 and the stepping motor 306.

The stepping motor 306 drives the pickup rollers 204, the conveying rollers 206, and the discharge rollers 209.

The scanner control unit 300 includes a scanner CPU 301, a scanner RAM 302, a scanner ROM 304, a motor controller 305, a clock controller 303, a reading controller 307, and a scanner transfer section 308.

The scanner ROM 304 stores scanner control programs.

The scanner CPU 301 loads the scanner control programs from the scanner ROM 304 into the scanner RAM 302 and executes the loaded programs. Thus, a scanner controller is realized.

The motor controller 305 communicates with the stepping motor 306.

The reading controller 307 controls a reading process performed by the sensor unit 211 using the CIS 208.

The clock controller 303 includes a crystal oscillator, and a PLL (Phase Locked Loop) element for multiplying or dividing the frequency of a clock generated by the crystal oscillator, and generates a clock signal supplied to the components of the control system of the scanner section 112. The clock controller 303 may generate a clock signal synchronized with the transfer enable clock signal generated by the IO section 109 for the image bus 110.

The clock controller 303 changes the frequency of the clock signal generated thereby according to color scanning, monochrome scanning, a scanning resolution, and so forth. When the frequency of the clock signal is changed, the speed of reading an original is changed.

When conveying and reading an original, the motor controller 305, the reading controller 307, and the scanner RAM 302 can operate in synchronism with each other by each operating based on the clock signal generated by the clock controller 303.

The scanner transfer section 308 is connected to the scanner RAM 302 and the image bus 110.

The scanner transfer section 308 transfers image data generated by reading and stored in the scanner RAM 302, to the RAM 104 via the image bus 110, by transfer processing in synchronism with the transfer enable clock signal.

Figure 4:
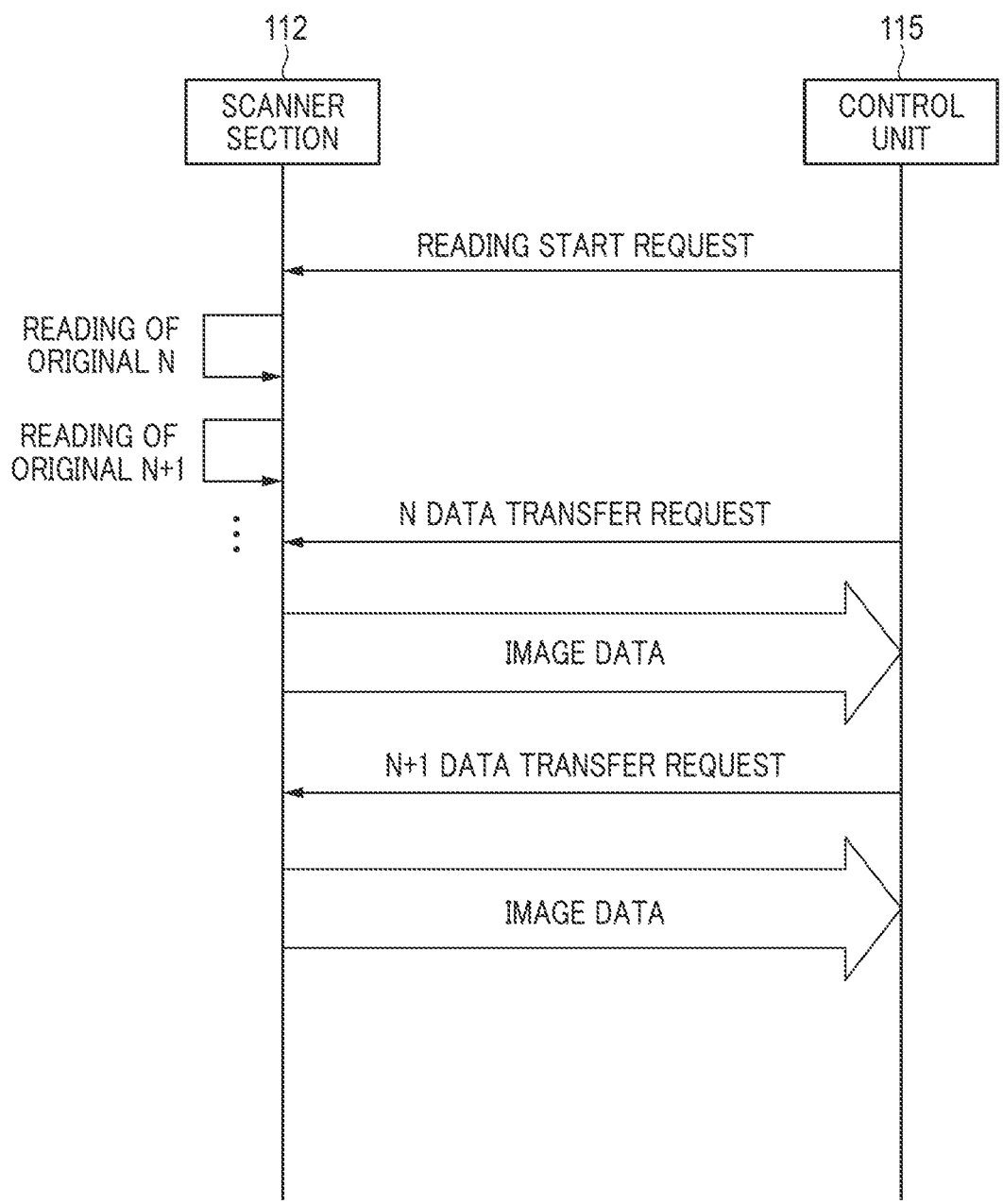
FIG. 4 is a sequence diagram of a reading operation performed by the scanner section.

FIG. 4 is a sequence diagram of a reading operation performed by the scanner section 112.

FIG. 4 shows processing performed by the scanner section 112 and processing performed by the control unit 115.

The CPU 103 of the control unit 115 executes the processing shown in FIG. 4 by executing a scanner control application program and a job control application program.

The CPU 103 of the control unit 115 outputs a reading start request to the scanner CPU 301 of the scanner section 112 so as to start the scanning process.

The scanner CPU 301 of the scanner section 112 causes the clock controller 303 to generate a clock signal based on the reading start request. A plurality of originals placed on the original tray 200 are sequentially conveyed to the reading window 207 one by one. Items of image data are sequentially generated one by one by reading the originals, respectively. The sequentially generated image data items are stored in the scanner RAM 302 in the order of generation.

After outputting the reading start request, the CPU 103 of the control unit 115 repeatedly outputs a request for transferring image data obtained by the scanning process, on an image data item-by-image data item basis.

The scanner transfer section 308 of the scanner section 112 outputs the image data stored in the scanner RAM 302 to the image bus 110 in synchronism with the transfer enable clock signal according to this transfer request. The IO section 109 outputs the image data transferred from the image bus 110 to the system bus 101. With this, the image data output by the scanner transfer section 308 to the image bus 110 is stored in the RAM 104.

Figure 5:
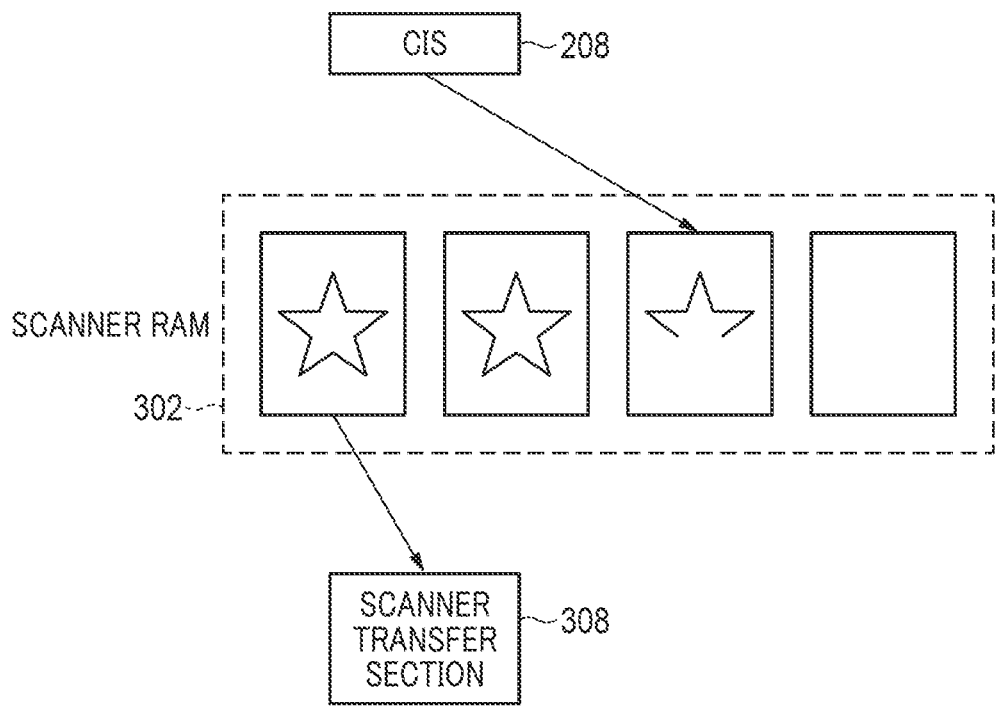
FIG. 5 is a diagram useful in explaining how image data is input to and output from a scanner RAM of the scanner section.

FIG. 5 is a diagram useful in explaining how image data is input to and output from the scanner RAM 302 of the scanner section 112.

The scanner RAM 302 appearing in FIG. 5 has a capacity capable of storing image data generated by reading four sheets of A4-size full-color originals.

The CIS 208 sequentially stores read image data items in the scanner RAM 302.

The scanner transfer section 308 sequentially reads out the image data items stored in the scanner RAM 302 to output the read image data items to the control unit 115.

In FIG. 5, the processing performed by the CIS 208 for writing image data into the scanner RAM 302, and the processing performed by the scanner transfer section 308 for reading out the image data from the scanner RAM 302 are synchronously performed. With this, a plurality of image data items obtained by the scanner section 112 sequentially reading a plurality of originals are transferred to and stored in the RAM 104 of the control unit 115 without missing any of the image data items.

Figure 6:
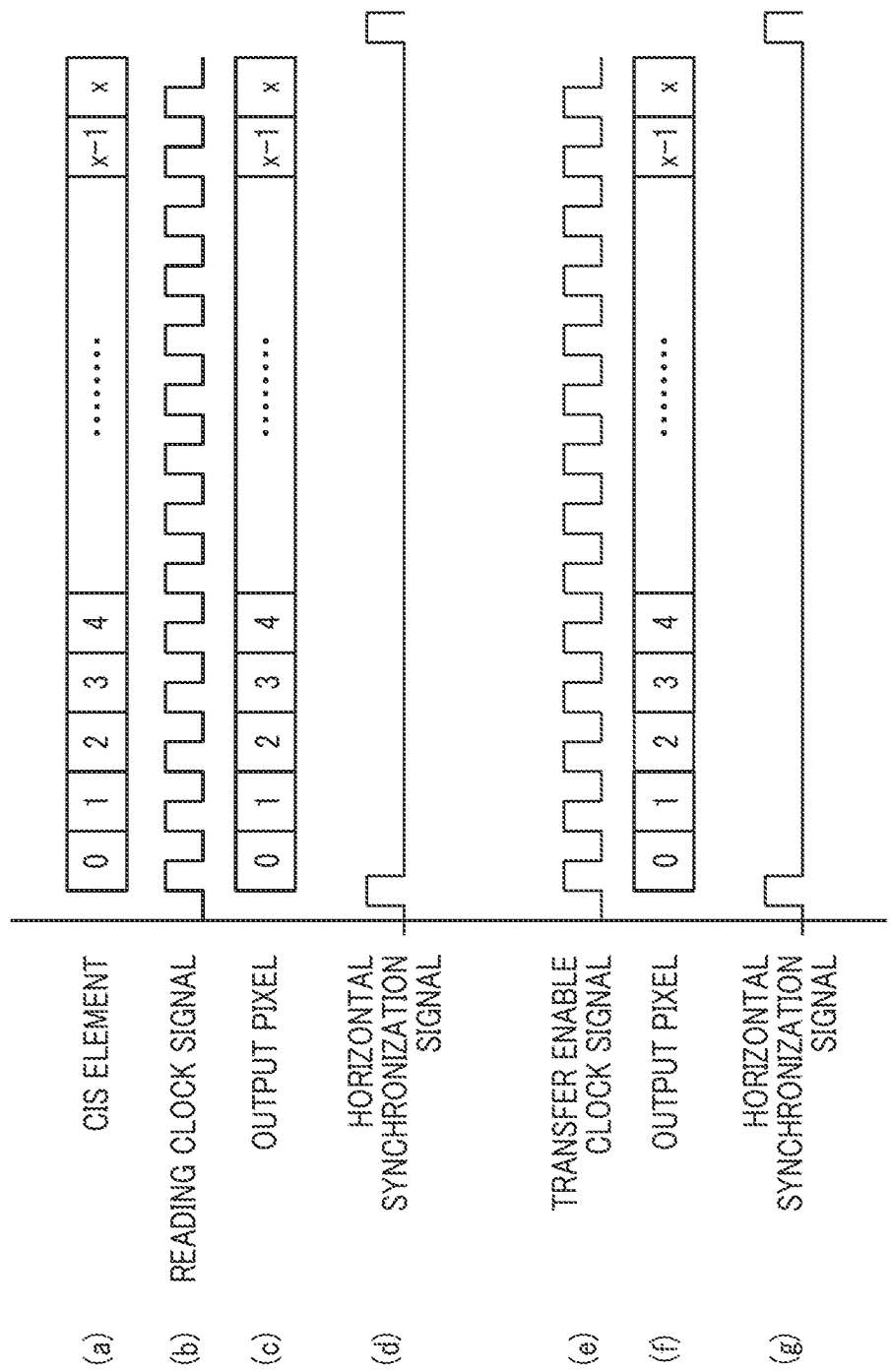
FIG. 6 is a timing diagram showing an example of timing of signals, at which synchronous processes in FIG. 5 can be realized.

FIG. 6 is a timing diagram showing an example of timing of signals, at which the synchronous processes in FIG. 5 can be realized.

Referring to FIG. 6, (a) shows pixels read by the CIS 208 of the scanner section 112, (b) shows a readout clock signal generated by the clock controller 30, (c) shows pixels output from the CIS 208, and (d) shows a horizontal synchronization signal in the scanner section 112.

Further, (e) shows the transfer enable clock signal on the image bus 110, (f) shows pixels output from the scanner transfer section 308 to the image bus 110, and (g) shows a horizontal synchronization signal on the image bus 110.

As shown in FIG. 6, the readout clock signal in the scanner section 112 and the transfer enable clock signal on the image bus 110 are synchronized with each other. In this case, a pixel output from the CIS 208 of the scanner section 112 and a pixel output from the scanner transfer section 308 to the image bus 110 can be pixels located at the corresponding positions between different image data items. The scanner section 112 can transfer one sheet of image data to the control unit 115 in a time period over which the scanner section 112 reads one sheet of an original. As a result, it is possible to prevent image data from being additionally accumulated in the scanner RAM 302.

Note that the horizontal synchronization signal is a clock signal for controlling the start of capturing one line of data by the CIS 208. The pickup rollers 204 of the scanner section 112 are driven based on a PWM signal in synchronism with the horizontal synchronization signal. Therefore, if the period of the horizontal synchronization signal is reduced to improve the reading speed, the rotational speed of the pickup rollers 204 becomes relatively high, which increases the original conveying speed, whereby the reading speed per one sheet of an original can be improved. In the case where the period of the horizontal synchronization signal is reduced, it is necessary to perform readout from the CIS 208 in a shorter time, and hence the period of the readout clock signal is reduced. If the period of the readout clock signal is reduced, the speed of accumulation of data in the scanner RAM 302 is increased, and it is necessary to output data from the scanner RAM 302 in a shorter time in synchronism with the data accumulation. As a result, the amount of data transferred from the scanner section 112 to the RAM 104 or the image processor 111 via the image bus 110 per unit time is increased. As the transferred amount of data per unit time is increased, load on the image processor 111 or the image bus 110 is increased, so that, for example, delay is sometimes caused in image processing performed by the printer section 113 for operation of a print job and data transfer by the image bus 110.

Figure 7:
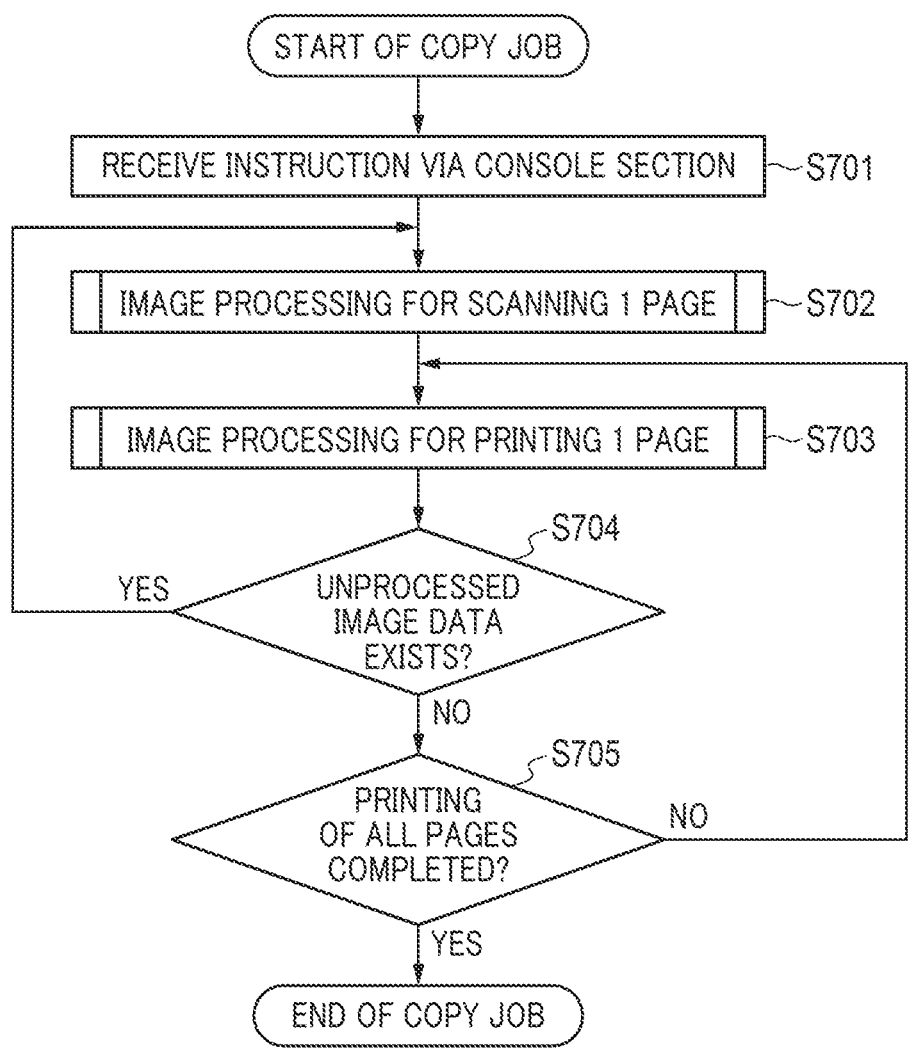
FIG. 7 is a flowchart of a process for executing a copy job, which is useful in explaining the overall operation of the multifunction peripheral.

FIG. 7 is a flowchart of a process for executing a copy job, which is useful in explaining the overall operation of the multifunction peripheral 100.

The CPU 103 of the control unit 115 performs the process in FIG. 7 in a case where a copy job is executed.

In a step S701, the CPU 103 of the control unit 115 receives an instruction for executing a copy job, via the console section 114.

In a step S702, the CPU 103 instructs the scanner section 112 to start the scanning process. The scanner section 112 stores one image data item obtained by the scanning process, in the RAM 104.

After the one image data item obtained by the scanning process is stored in the RAM 104, in a step S703, the CPU 103 starts a printing process of one image data item stored in the RAM 104. The CPU 103 instructs the image processor 111 to perform processing for converting the image data item to data for printing, and instructs the printer section 113 to print the converted image data item. As a result, an image of an original scanned by the scanner section 112 is printed on a sheet.

In a step S704, the CPU 103 determines whether or not any unprocessed image data item exists in the RAM 104. If any unprocessed image data item exists, the CPU 103 returns to the step S702. The CPU 103 repeats the above-mentioned processing until all image data items are processed. If there is no unprocessed image data item, the CPU 103 proceeds to a step S705.

In the step S705, the CPU 103 determines whether or not the printing process is completed for all of image data items. If the printing process is not completed for all of image data items, the CPU 103 returns to the step S703. The CPU 103 repeats the above-mentioned processing until the printing process is completed for all of image data items. If the printing process is completed for all of image data items, the CPU 103 terminates the copy job process in FIG. 7.

Figure 8:
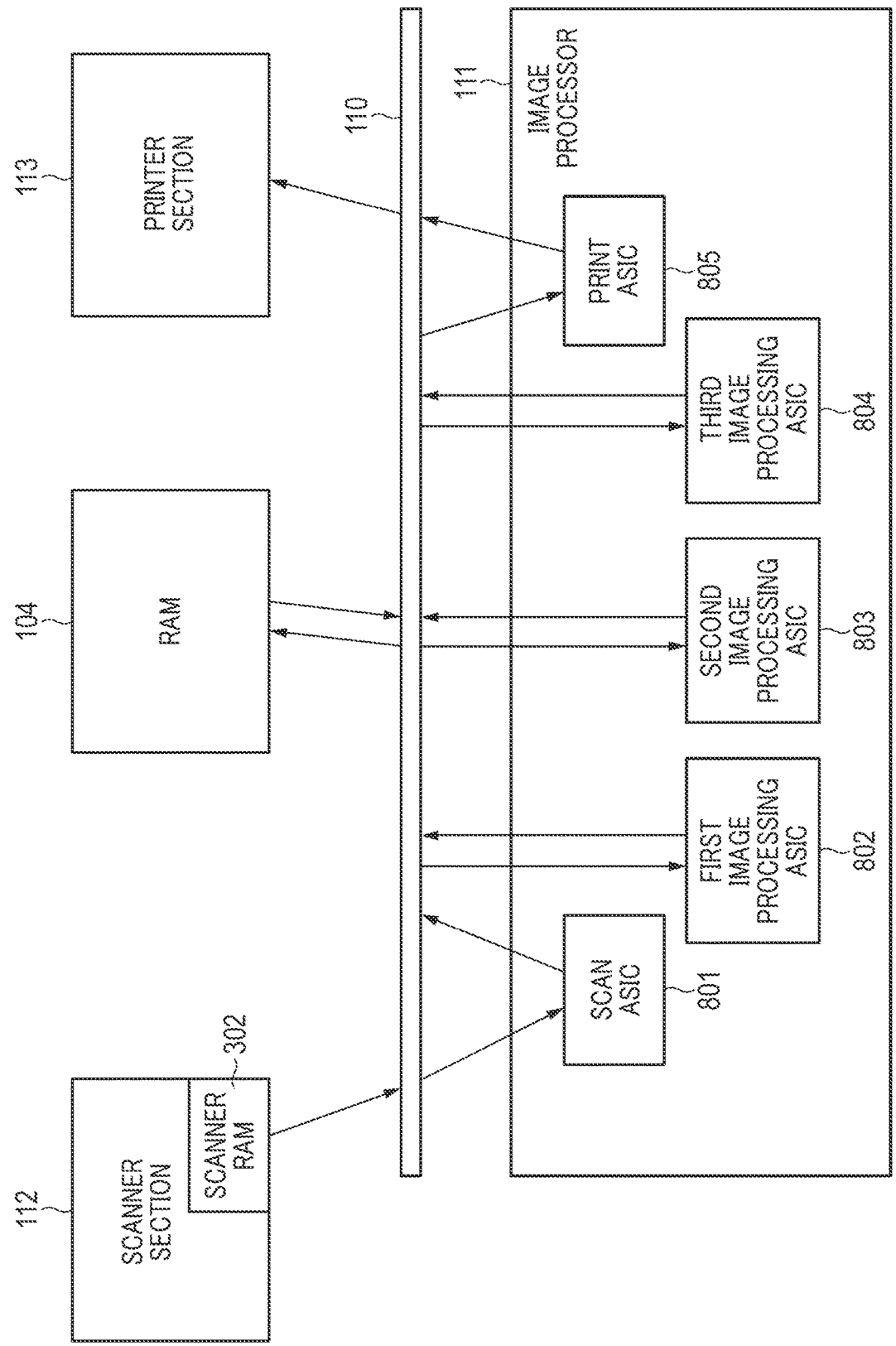
FIG. 8 is a diagram useful in explaining how data is transferred via an image bus in the copy job in FIG. 7.

FIG. 8 is a diagram useful in explaining how data is transferred via the image bus 110 in the cop job in FIG. 7.

In FIG. 8, to simplify the explanation, the RAM 104 of the control unit 115 is illustrated as being directly connected to the image bus 110. Further, in the image processor 111, a scan ASIC 801, a first image processing ASIC 802, a second image processing ASIC 803, a third image processing ASIC 804, and a print ASIC 805, for executing various types of image conversion processing, are illustrated.

The image processor 111 performs PDL data processing, Rip processing, and processing for converting image data stored in the system memory 105 e.g. to JPEG or PDF data using a plurality of ASICs in combination. Further, the image processor 111 performs Fax processing for converting the image format so as to perform Fax transmission, and so on, using a plurality of ASICs in combination.

In the copy job in FIG. 7, the scanner section 112 outputs image data stored in the scanner RAM 302 to the image bus 110.

The scan ASIC 801 acquires image data from the image bus 110, and outputs the processed image data to the image bus 110 to store the image data in the RAM 104 of the control unit 115.

The first image processing ASIC 802 acquires image data from the image bus 110, and outputs the processed image data to the image bus 110.

The second image processing ASIC 803 acquires image data from the image bus 110, and outputs the processed image data to the image bus 110.

The third image processing ASIC 804 acquires image data from the image bus 110, and outputs the processed image data to the image bus 110 to store the image data in the RAM 104 of the control unit 115.

The print ASIC 805 acquires image data from the RAM 104 of the control unit 115 via the image bus 110, and outputs the processed image data to the image bus 110.

The printer section 113 acquires image data from the image bus 110 and executes processing for printing the image data on a sheet.

FIGS. 7 and 8 show a case of the copy job by way of example. The multifunction peripheral 100 can scan an original, print image data, and perform facsimile communication, by combining processes performed by respective components, such as the scanner section 112, the image processor 111, the printer section 113, and the LAN interface 106 for communication.

For this reason, one image data item for the copy job is transferred via the image bus 110 many times.

Incidentally, in the multifunction peripheral 100, the processing capability per unit time is important, and to improve the processing capability, it is envisaged to increase the speed of the scanning process. By increasing the speed of the scanning process, it is possible to complete the scanning process in a short time to thereby quickly free the user from the job.

However, if the speed of the scanning process by the multifunction peripheral 100 is increased, load of data transfer from the scanner section 112 to the image memory is increased. If the speed of reading an original by the scanner section 112 is increased, it is necessary to accordingly increase the speed of the transfer enable clock signal. As a result, in the multifunction peripheral 100, an increase in the speed of the scanning process causes a large amount of data to be instantaneously transferred from the scanner section 112 to the image bus 110, and hence it may be difficult to execute another process in parallel with the scanning process. Further, the data transfer capacity of the image bus 110 is limited, and hence if the amount of transfer data exceeds the data transfer capacity of the image bus 110 to which the image memory is connected, the multifunction peripheral 100 cannot normally perform image processing, resulting in interruption of the image processing.

Particularly, in the scanning process, it is important for the scanner section 112 to read an image of an original being conveyed at a reading position while conveying the original at a stable constant conveying speed.

For this reason, differently from the other processing sections of the multifunction peripheral 100, in a case where a plurality of originals are continuously read, it is not desirable that the scanner section 112 interrupts the printing process or changes the reading speed in the middle of reading.

If the printing process is interrupted or the reading speed is changed in the middle of reading, there is a possibility that image quality of the read image is degraded.

Thus, the multifunction peripheral 100 is required to prevent the quality of the image obtained by the scanning process from being degraded and properly execute a plurality of processes including the scanning process while enabling a user to be quickly freed from a job by increasing the speed of the scanning process performed by the scanner section 112.

To meet this requirement, in the present embodiment, the CPU 103 of the control unit 115 as a setting unit switches the transfer enable clock signal generated by the IO section 109 between a high frequency for high-speed transfer and a low frequency for low-speed transfer. Further, the CPU 103 of the control unit 115 switches a clock signal of the scanner section 112, generated by the clock controller 303 of the scanner section 112, according to the transfer enable clock signal. Here, a processing mode in which the amount of data transferred to the image bus 110 is reduced by reducing the speed of the transfer enable clock signal so as to execute the scanning process and other processes in parallel is referred to as the parallel transfer mode. Further, a processing mode in which the amount of data transferred to the image bus 110 is increased by increasing the speed of the transfer enable clock signal so as to singly or independently execute the scanning process at high speed is referred to as the single transfer mode. These modes will be described in detail hereafter.

Further, in the present embodiment, the user selects and sets a control mode using the console section 114 in advance, from a control mode in which the scanning process is preferentially executed and a control mode in which the scanning process and other process(es) are executed in parallel. The setting of the control mode is stored e.g. in the system memory 105 together with other settings.

Figure 9:
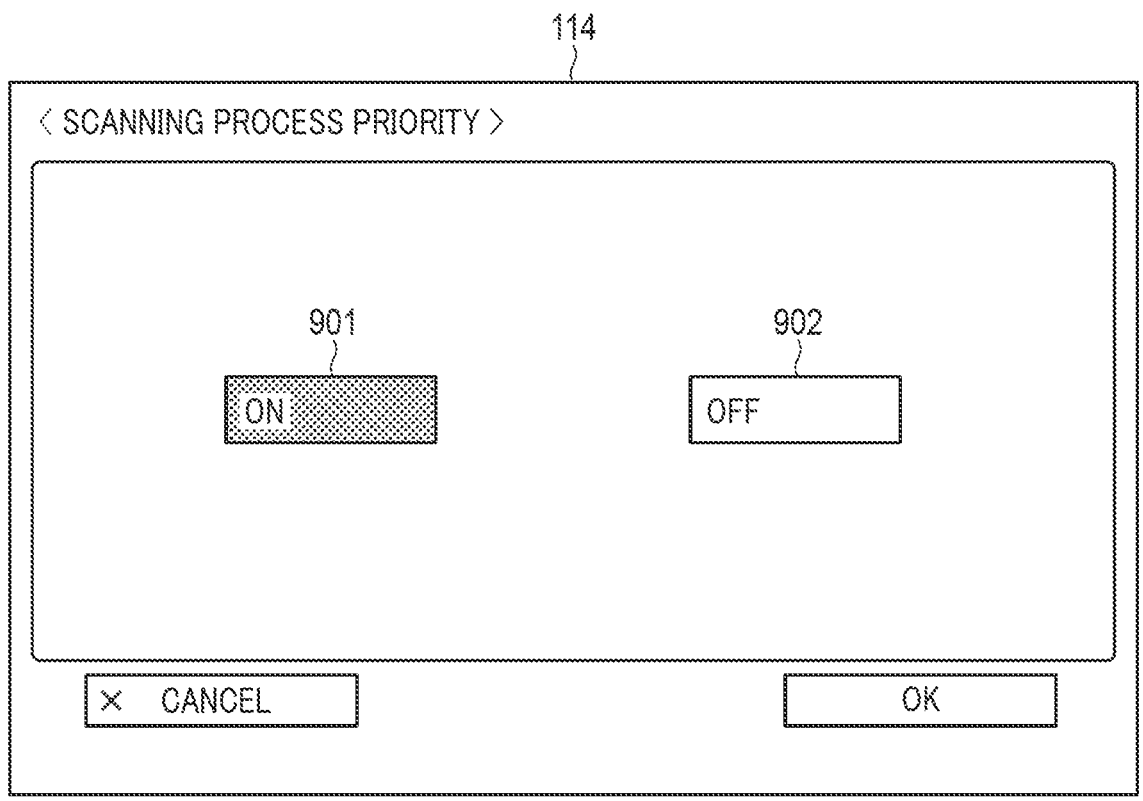
FIG. 9 is a view of a scanning process priority-setting screen displayed on an LCD touch panel of a console section.

FIG. 9 is a view of a scanning process priority-setting screen displayed on the LCD touch panel of the console section 114.

On the scanning process priority-setting screen shown in FIG. 9, a priority setting-on button 901 and a priority setting-off button 902 are selectively displayed.

A user operates one of the above-mentioned buttons.

In a case where the priority setting-on button 901 is operated by the user, the console section 114 outputs a signal indicating that the scanning process is to be preferentially executed, and the CPU 103 stores the setting indicating that scanning process is to be preferentially executed, in the system memory 105. In this case, when executing a plurality of processes including the scanning process, the CPU 103 suspends and interrupts the other process(es) so as to preferentially execute the scanning process based on a scanning process priority setting, and basically executes the processes in the single transfer mode.

In a case where the priority setting-off button 902 is operated by the user, the console section 114 outputs a signal indicating that the scanning process is not to be preferentially executed, and the CPU 103 stores a setting indicating that the scanning process is not to be preferentially executed, in the system memory 105. In this case, when executing a plurality of processes including scanning process, the CPU 103 basically executes the plurality of processes in parallel in the parallel transfer mode based on the setting of the scanning process.

Figure 10:
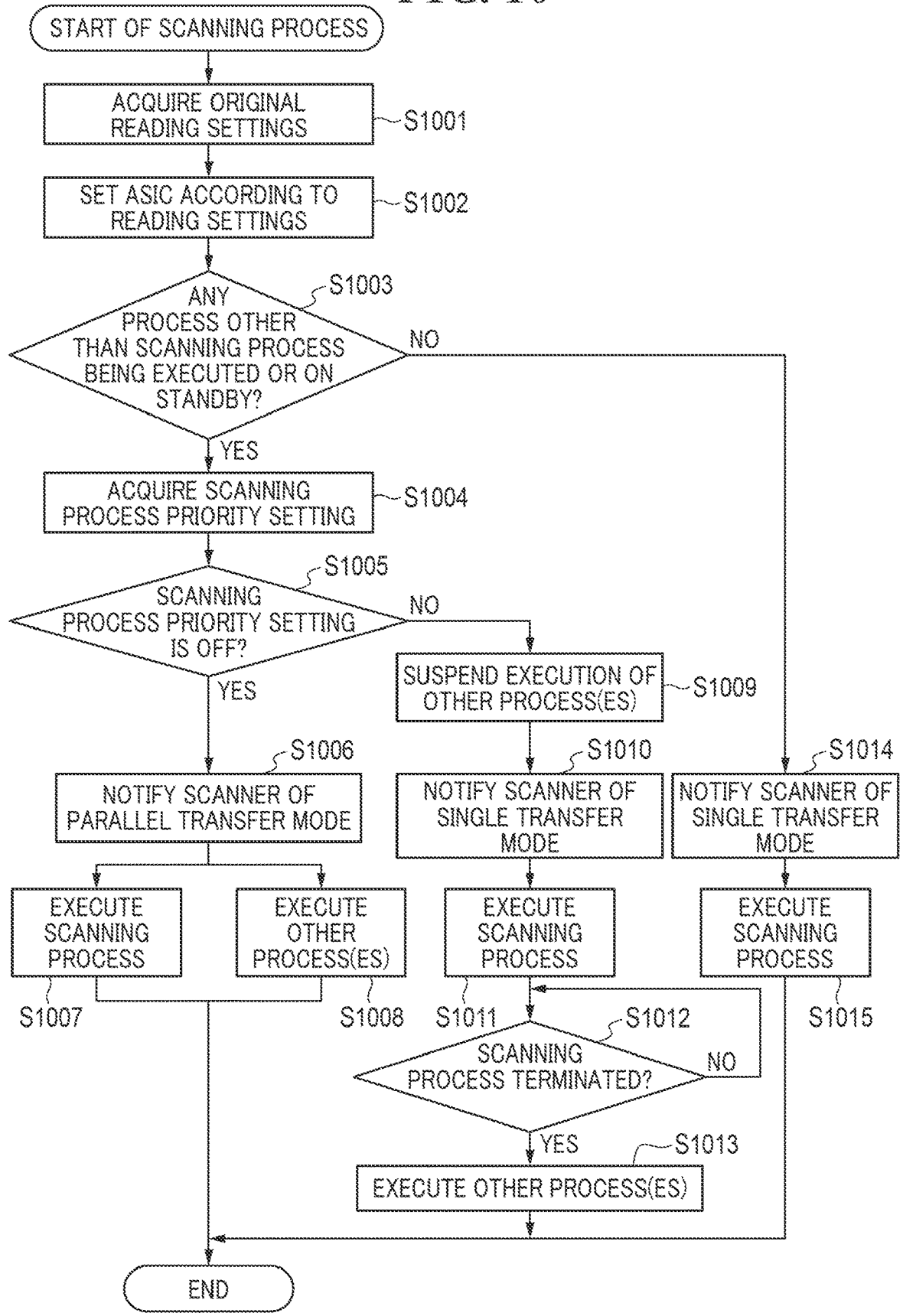
FIG. 10 is a flowchart useful in explaining execution of a scanning process in the first embodiment.

FIG. 10 is a flowchart useful in explaining execution of the scanning process in the first embodiment.

The CPU 103 of the controller unit 115 performs the scanning process in FIG. 10 in a case where the scanner section 112 is started.

In a step S1001 in FIG. 10, the CPU 103 of the controller unit 115 acquires settings for reading an original.

In a step S1002, the CPU 103 determines an ASIC of the image processor 111, which is to be used for executing the scanning process (Scan ASIC 801 in FIG. 8), based on the reading settings acquired in the step S1001, and makes settings of the ASIC to be used.

In a step S1003, the CPU 103 as a parallel determination unit determines whether or not any process other than the scanning process is being executed or on standby.

If any process other than the scanning process is not being executed or on standby, the CPU 103 proceeds to a step S1014.

In the step S1014, the CPU 103 notifies the scanner section 112 and the IO section 109 that operation of the scanning process is to be started in the single transfer mode, followed by terminating the process in FIG. 10. In a step S1015, the scanner section 112 starts the scanning process according to the notification received from the CPU 103.

The IO section 109 sets the transfer enable clock signal by switching the frequency thereof to the high frequency for high-speed transfer. The clock controller 303 of the scanner section 112 changes the clock signal of the scanner section 112 according to the transfer enable clock signal. With this, the scanner section 112 conveys and reads a plurality of originals placed on the original tray 200 at high speed. The scanner transfer section 308 of the scanner section 112 outputs image data stored in the scanner RAM 302 to the image bus 110 in synchronism with the transfer enable clock signal with the high frequency for high-speed transfer. The ASIC of the image processor 111 processes the image data transferred at the high data transfer rate. The image bus 110 can transfer the image data without exceeding the limit of its transfer capacity.

Note that when the scanning process is terminated, the CPU 103 may notify the IO section 109 that operations of processes are to be performed in the parallel transfer mode.

With this notification, the IO section 109 switches the frequency of the transfer enable clock signal to the low frequency for low-speed transfer.

If it is determined in the step S1003 that any process other than the scanning process is being executed or on standby, the CPU 103 proceeds to a step S1004.

In the step S1004, the CPU 103 acquires the scanning process priority setting (on/off) set in advance on the above-mentioned setting screen shown in FIG. 9.

In a step S1005, the CPU 103 determines whether or not the scanning process priority setting acquired in the step S1004 is set to off.

If the scanning process priority setting is set to off, the CPU 103 proceeds to a step S1006. If the scanning process priority setting is not set to off, the CPU 103 proceeds to a step S1009.

In the step S1006, the CPU 103 notifies the scanner section 112 and the IO section 109 that the operations of the processes are to be performed in the parallel transfer mode, followed by terminating the process in FIG. 10. In this case, in a step S1007, the scanner section 112 starts the scanning process according to the notification received from the CPU 103. The IC) section 109 sets the transfer enable clock signal by switching the frequency thereof to the low frequency for low-speed transfer. The clock controller 303 of the scanner section 112 changes the clock signal of the scanner section 112 according to the transfer enable clock signal. Further, in a step S1008, the other processing section(s) which is/are executing the process(es) or on standby executes the process (es) being executed or on standby. Thus, the multifunction peripheral 100 executes the scanning process and the other process(es) in parallel. The image bus 110 can transfer the image data without exceeding the limit of its transfer capacity.

If the scanning process priority setting is set to on, the CPU 103 proceeds from the step S1005 to the step S1009 as mentioned above.

In the step S1009, the CPU 103 suspends execution of the other process(es) being executed or on standby.

In a step S1010, the CPU 103 notifies the scanner section 112 and the IO section 109 that the operation of the scanning process is to be performed in the single transfer mode. In a step S1011, the scanner section 112 starts the scanning process according to the notification received from the CPU 103.

The IO section 109 sets the transfer enable clock signal by switching the frequency thereof to the high frequency for high-speed transfer. The clock controller 303 of the scanner section 112 changes the clock signal of the scanner section 112 according to the transfer enable clock signal. With this, the scanner section 112 conveys and reads a plurality of originals placed on the original tray 200 at high speed. The scanner transfer section 308 of the scanner section 112 outputs image data stored in the scanner RAM 302 to the image bus 110 in synchronism with the transfer enable clock signal with the high frequency for high-speed transfer. The ASIC of the image processor 111 processes the image data transferred at the high data transfer rate. The image bus 110 can transfer the image data without exceeding the limit of its transfer capacity.

After notifying that the operation of the scanning process is to be performed in the single transfer mode, in a step S1012, the CPU 103 determines whether or not the scanning process performed by the scanner section 112 has been terminated.

If the scanning process has not been terminated, the CPU 103 repeats the determination on termination of the scanning process in the step S1012.

If the scanning process has been terminated, the CPU 103 proceeds to a step S1013.

In the step S1013, the CPU 103 notifies the IC) section 109 that the operation(s) of the other process(es) is/are to be performed in the parallel transfer mode, and restarts execution of the other process(es) suspended in the step S1009, followed by terminating the process in FIG. 10. The processing section(s) associated with the other process(es) restart(s) the process(es) while transferring image data in synchronism with the transfer enable clock signal with the low frequency for low-speed transfer.

Figure 11:
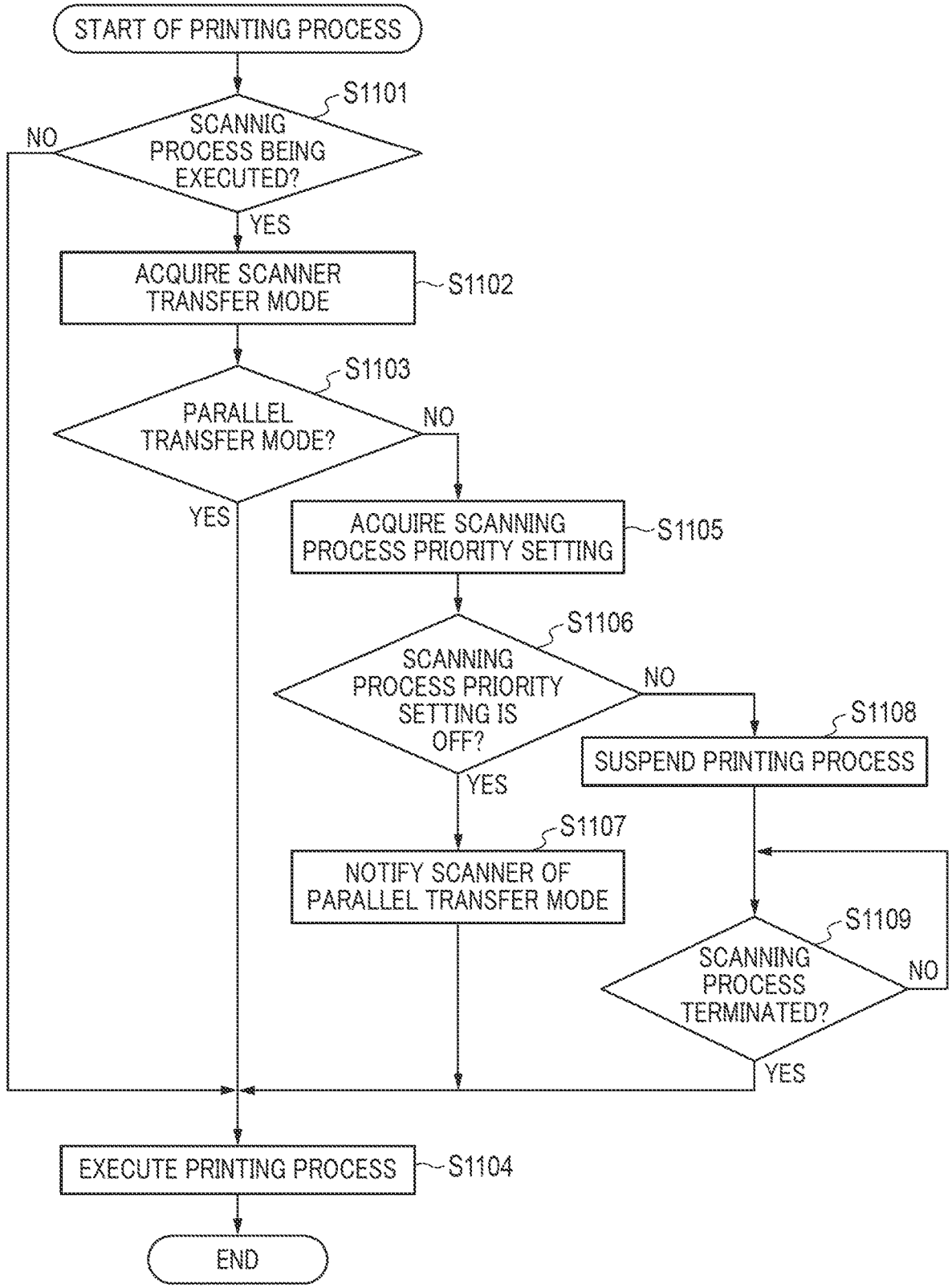
FIG. 11 is a flowchart useful in explaining execution of a process other than the scanning process in the first embodiment.

FIG. 11 is a flowchart useful in explaining execution of a process other than the scanning process in the first embodiment.

The CPU 103 of the control unit 115 performs the process in FIG. 11 in a case where the other process performed by the other processing section therefor is started.

FIG. 11 shows an example of a case where the printing process performed by the printer section 113 is started as the other process.

In a step S1101, the CPU 103 of the control unit 115 as the parallel determination unit determines whether or not the scanning process is being executed.

If the scanning process is not being executed, the CPU 103 proceeds to a step S1104.

In the step S1104, the CPU 103 notifies the printer section 113 as the other processing section and the IO section 109 that the operations of processes are to be performed in the parallel transfer mode, followed by terminating the process in FIG. 11. The printer section 113 starts the printing process while transferring image data in synchronism with the transfer enable clock signal with the low frequency for low-speed transfer.

If it is determined in the step S1101 that the scanning process is being executed, the CPU 103 proceeds to a step S1102.

In the step S1102, the CPU 103 acquires the transfer mode of the scanner section 112.

In a step S1103, the CPU 103 determines whether or not the transfer mode of the scanner section 112, acquired in the step S1102, is the parallel transfer mode.

If the transfer mode of the scanner section 112 is the parallel transfer mode, the CPU 103 proceeds to the step S1104. In the step S1104, the printer section 113 starts the printing process while transferring image data in synchronism with the transfer enable clock signal with the low frequency for low-speed transfer.

If the transfer mode of the scanner section 112 is the single transfer mode, the CPU 103 proceeds to a step S1105.

In the step S1105, the CPU 103 acquires the scanning process priority setting (on/off) set in advance on the above-mentioned setting screen shown in FIG. 9.

In a step S1106, the CPU 103 determines whether or not the scanning process priority setting, acquired in the step S1105, is set to off.

If the scanning process priority setting is set to off, the CPU 103 proceeds to a step S1107.

In the step S1107, the CPU 103 notifies the scanner section 112 and the JO section 109 that the operations of processes are to be performed in the parallel transfer mode. In this case, the JO section 109 sets the transfer enable clock signal by switching the frequency thereof to the low frequency for low-speed transfer. The clock controller 303 of the scanner section 112 changes the clock signal of the scanner section 112 according to the transfer enable clock signal. With this, the scanner section 112 conveys and reads a plurality of originals placed on the original tray 200 at low speed. The scanner transfer section 308 of the scanner section 112 outputs image data stored in the scanner RAM 302 to the image bus 110 in synchronism with the transfer enable clock signal with the low frequency for low-speed transfer.

After that, in the step S1104, the printer section 113 starts the printing process while transferring image data in synchronism with the transfer enable clock signal with the low frequency for low-speed transfer. The image bus 110 can transfer the image data without exceeding the limit of its transfer capacity.

If it is determined in the step S1106 that the scanning process priority setting is set to on, the CPU 103 proceeds to a step S1108.

In the step S1108, the CPU 103 suspends execution of the print job. The scanner section 112 continues processing for conveying and reading the plurality of originals placed on the original tray 200 at high speed. The scanner transfer section 308 of the scanner section 112 continues processing for outputting image data stored in the scanner RAM 302 to the image bus 110 in synchronism with the transfer enable clock signal with the high frequency for high-speed transfer.

In a step S1109, the CPU 103 determines whether or not the scan job having been currently executed is terminated.

If the scan job having been currently executed is not terminated, the CPU103 repeats the determination on termination of the scan job in the step S1109.

If the scan job having been currently executed is terminated, the CPU103 proceeds to the step S1104.

In the step S1104, the CPU 103 notifies the IO section 109 that the operations of processes are to be performed in the parallel transfer mode, and starts execution of the printing process as the other process suspended in the step S1108. The printer section 113 starts the printing process while transferring image data in synchronism with the transfer enable clock signal with the low frequency for low-speed transfer.

As described above, the multifunction peripheral 100 of the present embodiment is capable of performing, in parallel, a plurality of processes including the scanning process using the scanner section 112 that continuously scans a plurality of originals at a reading speed and a conveying speed set according to a data transfer rate. Further, in a case where a plurality of processes including the scanning process are executed in parallel, the CPU 103 switches the operation mode between the single transfer mode and the parallel transfer mode based on a user's operation on the console section 114. In the single transfer mode, the transfer rate of data from the scanner section 112 to the image memory is made higher. In the parallel transfer mode, the transfer rate of data from the scanner section 112 to the image memory is made lower.

For example, on the setting screen for setting whether or not to give priority to the data transfer rate from the scanner section 112 to the image memory, if a user's operation for giving the priority is performed, the CPU 103 sets the data transfer rate by changing the same to high-speed transfer (high data transfer rate). Further, the CPU 103 preferentially performs the scanning process out of the plurality of processes including the scanning process to be performed in parallel. Here, the speed (transfer rate) of high-speed transfer may be a transfer rate corresponding to the maximum performance of the scanner section 112, at which data transfer for the scanner section 112 and data transfer for the other process(es) cannot be performed in parallel. With this priority setting, the multifunction peripheral 100 more preferentially performs the scanning process than the process(es) other than the scanning process, and for example, suspends the other process(es) until data transfer from the scanner section 112 to the image memory is terminated. Further, the multifunction peripheral 100 can execute the scanning process using the scanner section 112 at high speed, which enables the user to be quickly freed from the job.

In addition to the above, for example, in a case where the user's operation is not performed for giving the priority to the data transfer rate from the scanner section 112 to the image memory, the CPU 103 sets the data transfer rate by switching the same to low-speed transfer so as to perform a plurality of processes including the scanning process in parallel. Here, the speed (transfer rate) of low-speed transfer may be a transfer rate at which data transfer from the scanner section 112 to the image memory and data transfer to the image memory for the other process(es) can be performed in parallel. With this, the multifunction peripheral 100 can perform the other process(es) in parallel with the scanning process.

As described above, in the present embodiment, the multifunction peripheral 100 can prevent the image quality of an image obtained by the scanning process from being degraded, and properly perform a plurality of processes including the scanning process while enabling a user to be quickly freed from the job by increasing the speed of the scanning process using the scanner section 112. Further, the user can operate the multifunction peripheral 100 to perform processes as desired by setting the data transfer rate by an operation performed in advance.

In the present embodiment, the LCD touch panel of the console section 114 displays the priority setting screen related to the data transfer rate from the scanner section 112 to the image memory. The system memory 105 holds the setting of the data transfer rate made by user's operation performed on the priority setting screen in advance. In this state, the CPU 103 switches and sets the data transfer rate based on the setting stored in the system memory 105 in advance when starting the scanning process. Further, the CPU 103 switches and sets the data transfer rate based on the setting stored in the system memory 105 in advance when starting process(es) other than the scanning process. Therefore, the multifunction peripheral 100 can switch and set the data transfer rate based on the setting made by user's operation performed in advance.

Note that in the above-described embodiment, the CPU 103 sets the data transfer rate by switching the same between the high-speed transfer and the low-speed transfer only based on the setting of the data transfer rate made by user's operation.

In addition to this, for example, the CPU 103 may set the data transfer rate by switching the same between the high-speed transfer and the low-speed transfer based on information other than the setting of the data transfer rate made by user's operation. Further, the CPU 103 may set the data transfer rate by switching the same between three or more transfer rates.

Figure 12:
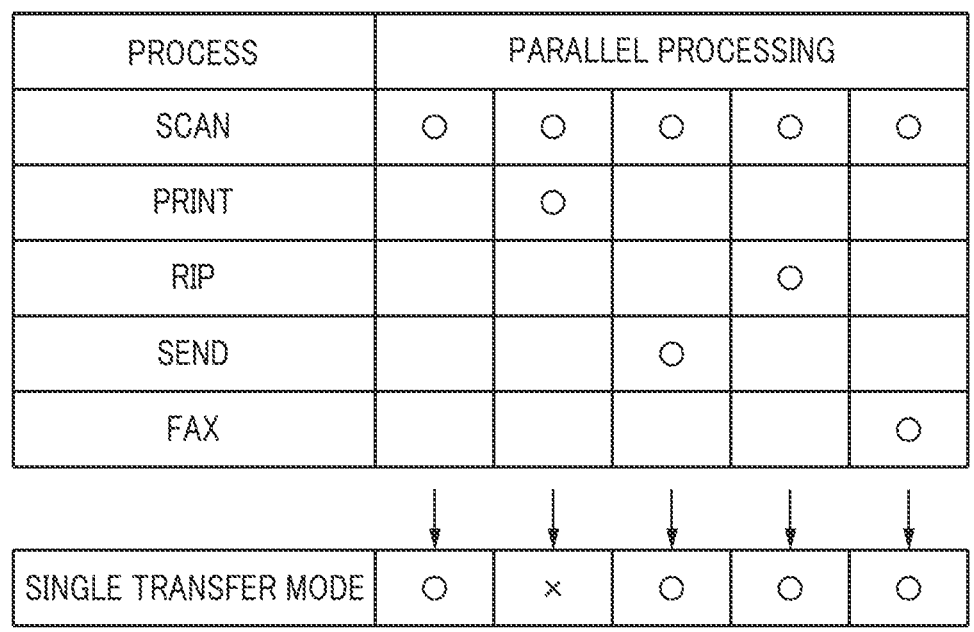
FIG. 12 is a table showing a plurality of types of processes including the scanning process, performed by the multifunction peripheral, and whether each of combinations of the processes allows the scanning process to be set to a single transfer mode.

FIG. 12 is a table showing a plurality of processes including the scanning process, performed by the multifunction peripheral 100, and whether each of combinations of the processes allows the scanning process to be set to the single transfer mode of the scanning process. The data of the table shown in FIG. 12 may be stored in the system memory 105.

As shown in FIG. 12, in the multifunction peripheral 100, in a case where the scanning process and the printing process are performed in parallel, there is a possibility that the amount of data transfer exceeds the upper limit of the transfer capacity of the image bus 110, and hence the setting of the single transfer mode is inhibited.

On the other hand, in another case, such as a case where the scanning process and a transmission process are performed in parallel, there is a low possibility that the amount of data transfer exceeds the upper limit of the transfer capacity of the image bus 110, and hence the setting of the single transfer mode is allowed.

In this case, the CPU 103 acquires the data of the table shown in FIG. 12 from the system memory 105 in the process in FIG. 10 or FIG. 11, determines a combination of a plurality of processes for parallel processing, and sets the single transfer mode or the parallel transfer mode according to the determination.

As a result, in a combination of processes, having a low possibility that the amount of data transfer exceeds the upper limit of the transfer capacity of the image bus 110, the scanner section 112 can operate at high speed in the single transfer mode, and increase the data transfer rate.

Next, a description will be given of the multifunction peripheral 100 according to a second embodiment of the present invention. In the present embodiment, the CPU 103 of the control unit 115 sets switching of the data transfer mode from the parallel transfer mode to the single transfer mode for high-speed scanning process, not based on a user's operation performed in advance, but based on a dynamic user's operation performed when starting a new process. The following description is given mainly of different points from the multifunction peripheral 100 according to the first embodiment.

Figure 13:
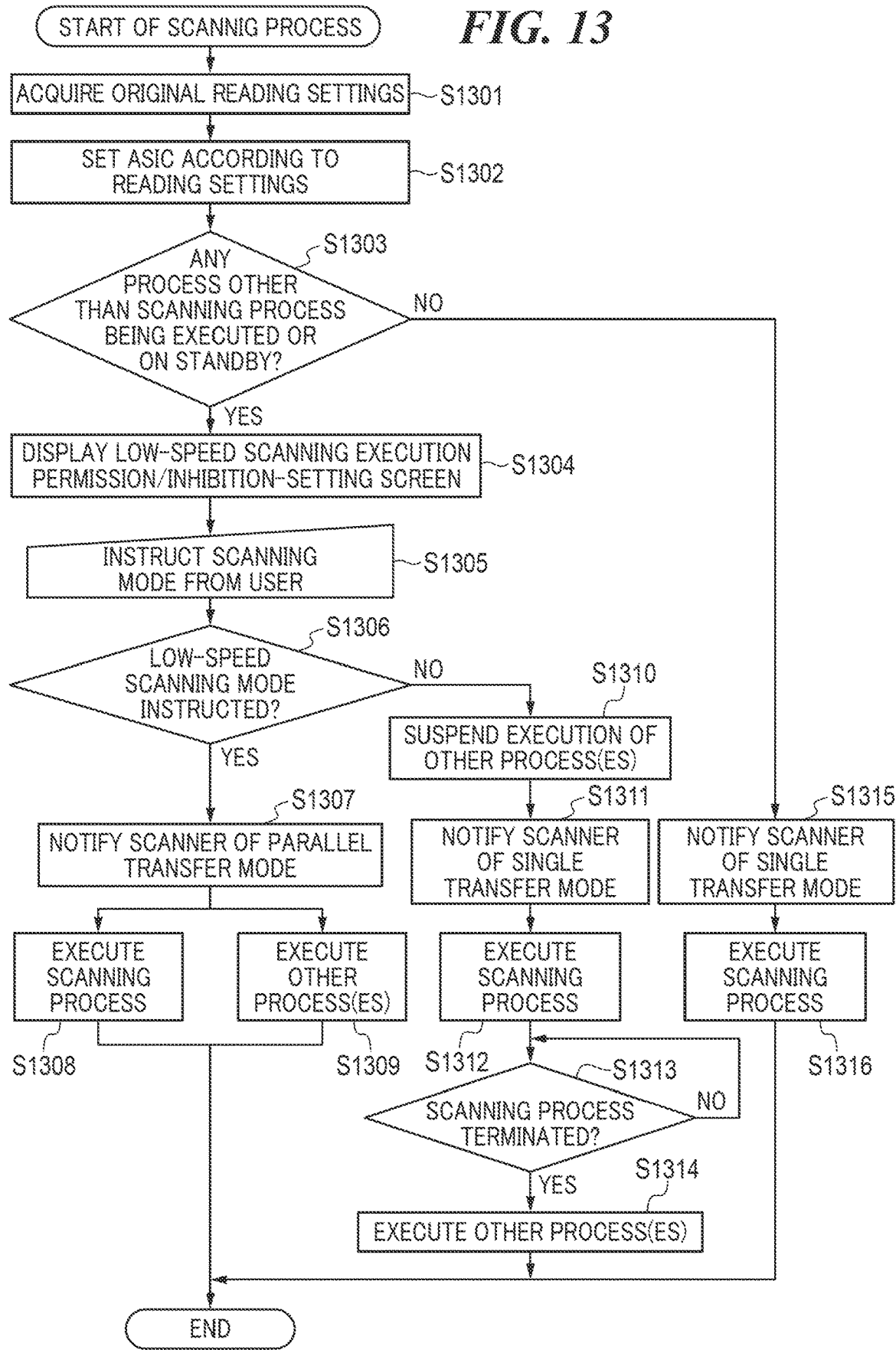
FIG. 13 is a flowchart useful in explaining execution of a scanning process in a second embodiment.

FIG. 13 is a flowchart useful in explaining execution of a scanning process in the second embodiment.

The CPU 103 of the control unit 115 performs the process in FIG. 13 when the scanning process by the scanner section 112 is started.

In a step S1301 in FIG. 13, the CPU 103 of the control unit 115 acquires settings for reading an original.

In a step S1302, the CPU 103 determines an ASIC of the image processor 111, which is to be used for executing the scanning process based on the reading settings acquired in the step S1301, and makes settings of the ASIC to be used.

In a step S1303, the CPU 103 as the parallel determination unit determines whether or not any process other than the scanning process is being executed or on standby.

If any other process is not being executed or on standby, the CPU 103 proceeds to a step S1315.

In the step S1315, the CPU 103 notifies the scanner section 112 and the JO section 109 that the operation of the scanning process is to be started in the single transfer mode, followed by terminating the process in FIG. 13. In a step S1316, the scanner section 112 starts the scanning process according to the notification received from the CPU 103.

The IO section 109 sets the transfer enable clock signal by switching the frequency thereof to the high frequency for high-speed transfer. The clock controller 303 of the scanner section 112 changes the clock signal of the scanner section 112 according to the transfer enable clock signal. With this, the scanner section 112 conveys and reads a plurality of originals placed on the original tray 200 at high speed. The scanner transfer section 308 of the scanner section 112 outputs image data stored in the scanner RAM 302 to the image bus 110 in synchronism with the transfer enable clock signal with the high frequency for high-speed transfer. The ASIC of the image processor 111 processes the image data transferred at the high data transfer rate. The image bus 110 can transfer the image data without exceeding the limit of its transfer capacity.

Note that when the scanning process is terminated, the CPU 103 may notify the IO section 109 that the operations of processes are to be performed in the parallel transfer mode. With this notification, the IO section 109 switches the frequency of the transfer enable clock signal to the low frequency for low-speed transfer.

If it is determined in the step S1303 that any process other than the scanning process is being executed or on standby, the CPU 103 proceeds to a step S1304.

In the step S1304, the CPU 103 displays a low-speed scanning execution permission/inhibition-setting screen, for the current scanning process, on the LCD touch panel of the console section 114.

Figure 14:
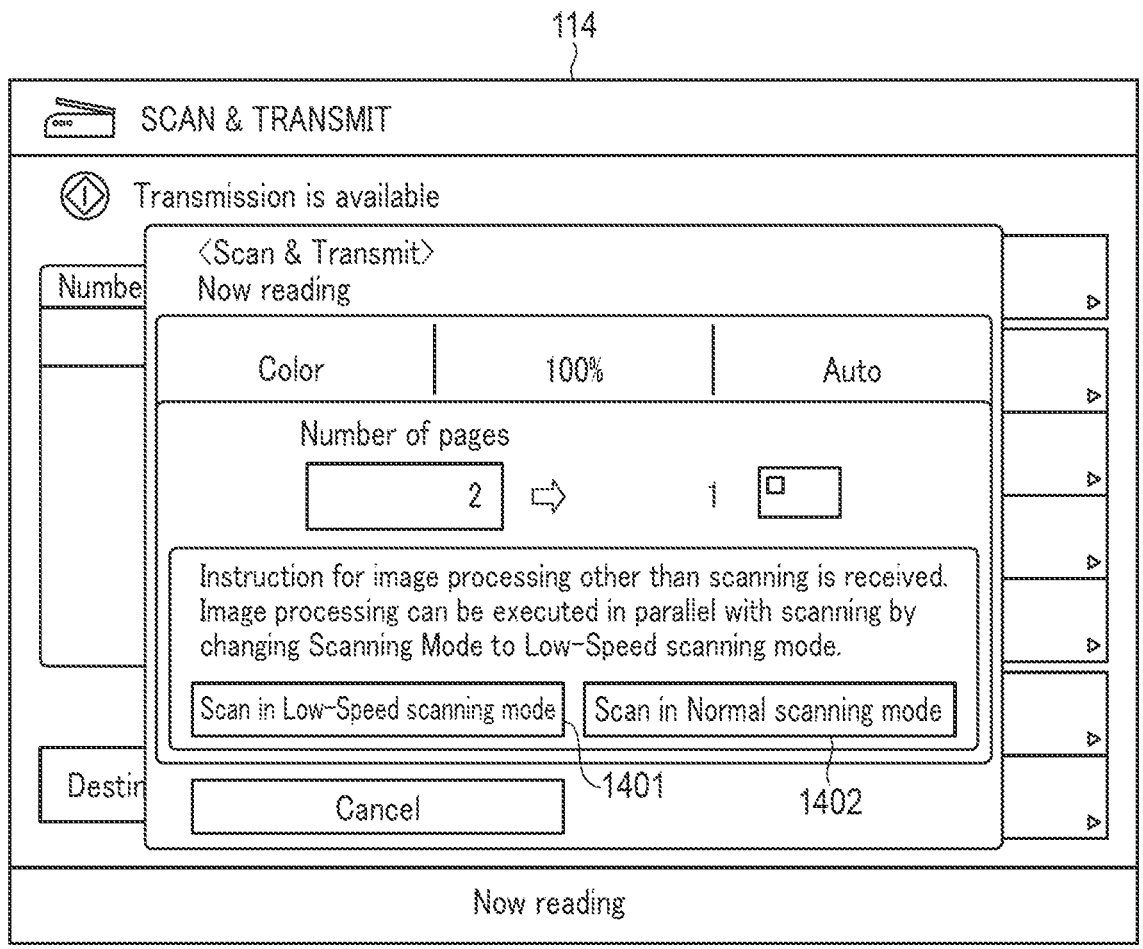
FIG. 14 is a view of a low-speed scanning execution permission/inhibition-setting screen, displayed on the LCD touch panel of the console section.

FIG. 14 is a view of the low-speed scanning execution permission/inhibition-setting screen displayed on the LCD touch panel of the console section 114.

On the low-speed scanning execution permission/inhibition-setting screen shown in FIG. 14, a button 1401 for selecting a scanning mode in which low-speed scanning is performed (parallel transfer mode) and a button 1402 for selecting a normal scanning mode in which high-speed scanning is performed (single transfer mode) are selectively displayed.

The user operates one of the above-mentioned selection buttons.

In a step S1305, the CPU 103 acquires a setting signal output from the console section 114 based on the user's operation thereon.

In a step S1306, the CPU 103 determines whether or not the low-speed scanning mode has been selected.

If the low-speed scanning mode has been selected, the CPU 103 proceeds to a step S1307. If the low-speed scanning mode has not been selected, the CPU 103 proceeds to a step S1310.

In the step S1307, the CPU 103 notifies the scanner section 112 and the JO section 109 that the operations of the processes are to be performed in the parallel transfer mode, followed by terminating the process in FIG. 13. In this case, in a step S1308, the scanner section 112 starts the scanning process according to the notification received from the CPU 103. The IO section 109 sets the transfer enable clock signal by switching the frequency thereof to the low frequency for low-speed transfer. The clock controller 303 of the scanner section 112 changes the clock signal of the scanner section 112 according to the transfer enable clock signal. Further, in a step S1309, the other processing section(s) which is/are executing the process(es) or on standby executes the process (es) being executed or on standby. Thus, the multifunction peripheral 100 executes the scanning process and the other process(es) in parallel. The image bus 110 can transfer the image data without exceeding the limit of its transfer capacity.

If it is determined in the step S1306 that the high-speed scanning mode has been selected, in the step S1310, the CPU 103 suspends the other process(es) being executed or on standby.

In a step S1311, the CPU 103 notifies the scanner section 112 and the IO section 109 that the operation of the scanning process is to be performed in the single transfer mode. In a step S1312, the scanner section 112 starts the scanning process according to the notification received from the CPU 103.

The IO section 109 sets the transfer enable clock signal by switching the frequency thereof to the high frequency for high-speed transfer. The clock controller 303 of the scanner section 112 changes the clock signal of the scanner section 112 according to the transfer enable clock signal. With this, the scanner section 112 conveys and reads a plurality of originals placed on the original tray 200 at high speed. The scanner transfer section 308 of the scanner section 112 outputs the image data stored in the scanner RAM 302 to the image bus 110 in synchronism with the transfer enable clock signal with the high frequency for high-speed transfer. The ASIC of the image processor 111 processes the image data transferred at the high data transfer rate. The image bus 110 can transfer the image data without exceeding the limit of its transfer capacity.

After notifying that the operation of the scanning process is to be performed in the single transfer mode, in a step S1313, the CPU 103 determines whether or not the scanning process performed by the scanner section 112 has been terminated.

If the scanning process has not been terminated, the CPU 103 repeats the determination on termination of the scanning process in the step S1313.

If the scanning process has been terminated, the CPU 103 proceeds to a step S1314.

In the step S1314, the CPU 103 notifies the IO section 109 that the operation(s) of the other process(es) is/are to be performed in the parallel transfer mode, and restarts execution of the other process(es) suspended in the step S1310, followed by terminating the process in FIG. 13. The processing section(s) associated with the other process(es) restart(s) the process(es) while transferring image data in synchronism with the transfer enable clock signal with the low frequency for low-speed transfer.

Figure 15:
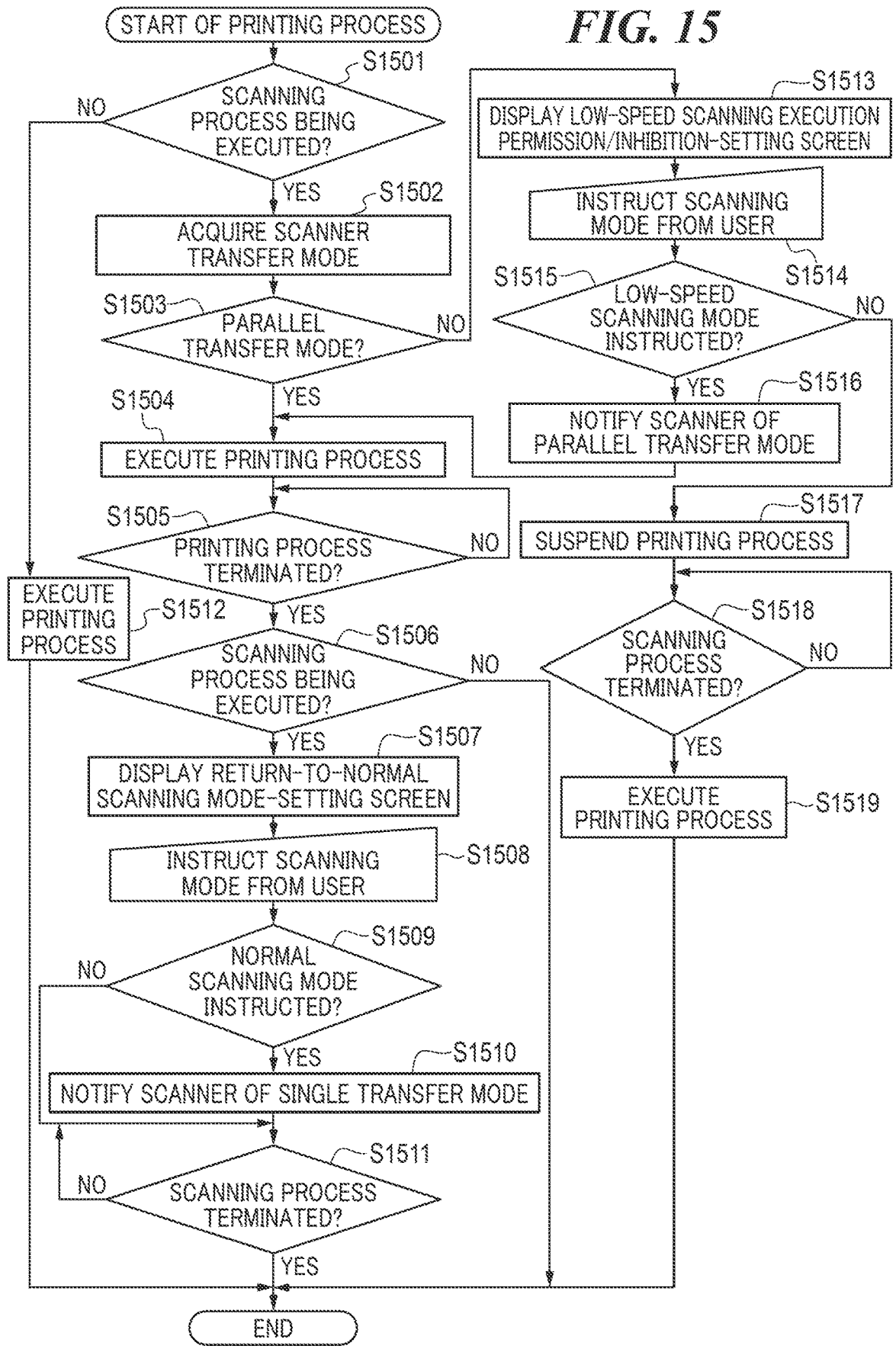
FIG. 15 is a flowchart useful in explaining execution of a process other than the scanning process in the second embodiment.

FIG. 15 is a flowchart useful in explaining execution of a process other than the scanning process in the second embodiment.

The CPU 103 of the control unit 115 performs the process in FIG. 15 in a case where the other process performed by the other processing section, which has been suspended, is started.

FIG. 15 shows an example of a case where the printing process performed by the printer section 113 is started as the other processing.

In a step S1501, the CPU 103 of the control unit 115 as the parallel determination unit determines whether or not the scanning process is being executed.

If the scanning process is not being executed, the CPU 103 proceeds to a step S1512.

In the step S1512, the CPU 103 notifies the printer section 113 as the other processing section and the IO section 109 that the operations of processes are to be performed in the parallel transfer mode, followed by terminating the process in FIG. 15. The printer section 113 starts the printing process while transferring image data in synchronism with the transfer enable clock signal with the low frequency for low-speed transfer.

If the scanning process is being executed, the CPU 103 proceeds to a step S1502.

In the step S1502, the CPU 103 acquires the transfer mode of the scanner section 112.

In a step S1503, the CPU 103 determines whether or not the transfer mode of the scanner section 112, acquired in the step S1502, is the parallel transfer mode.

If the transfer mode of the scanner section 112 is the parallel transfer mode, the CPU 103 proceeds to a step S1504. In the step S1504, the printer section 113 starts the printing process while transferring image data in synchronism with the transfer enable clock signal with the low frequency for low-speed transfer.

If the transfer mode of the scanner section 112 is the single transfer mode, the CPU 103 proceeds to a step S1513.

In the step S1513, the CPU 103 displays the low-speed scanning execution permission/inhibition-setting screen shown in FIG. 14 for the current other process on the LCD touch panel of the console section 114.

The user operates one of the above-mentioned buttons.

In a step S1514, the CPU 103 acquires a setting signal output from the console section 114 based on a user's operation.

In a step S1515, the CPU 103 determines whether or not the low-speed scanning mode has been selected by operating the selection button 1401.

If the low-speed scanning mode has been selected, the CPU 103 proceeds to a step S1516. If the low-speed scanning mode has not been selected, the CPU 103 proceeds to a step S1517.

In the step S1516, the CPU 103 notifies the printer section 113 as the other processing section, the scanner section 112, and the IO section 109 that the operations of processes are to be performed in the parallel transfer mode.

In this case, the IO section 109 sets the transfer enable clock signal by switching the frequency thereof to the low frequency for low-speed transfer. The clock controller 303 of the scanner section 112 changes the clock signal of the scanner section 112 according to the transfer enable clock signal. With this, the scanner section 112 conveys and reads a plurality of originals placed on the original tray 200 at the low speed. The scanner transfer section 308 of the scanner section 112 outputs image data stored in the scanner RAM 302 to the image bus 110 in synchronism with the transfer enable clock signal with the low frequency for low-speed transfer. The ASIC of the image processor 111 processes the image data transferred at the low data transfer rate. The image bus 110 can transfer the image data without exceeding the limit of its transfer capacity.

In the step S1504, the printer section 113 starts the printing process while transferring image data in synchronism with the transfer enable clock signal with the low frequency for low-speed transfer.

If the high-speed scanning mode has been selected by operating the selection button 1402, in the step S1517, the CPU 103 suspends execution of the printing process as the other process.

In a step S1518, the CPU 103 determines whether or not the scanning process is completed.

If the scanning process is not completed, the CPU 103 repeats the determination in the step S1518.

If the scanning process is completed, in a step S1519, the CPU 103 notifies the printer section 113 as the other processing section and the JO section 109 that the operations of processes are to be started in the parallel transfer mode, followed by terminating the process in FIG. 15.

In this case, the JO section 109 sets the transfer enable clock signal by switching the frequency thereof to the low frequency for low-speed transfer. The clock controller 303 of the scanner section 112 changes the clock signal of the scanner section 112 according to the transfer enable clock signal.

The printer section 113 starts the printing process while transferring image data in synchronism with the transfer enable clock signal with the low frequency for low-speed transfer. The image bus 110 can transfer the image data without exceeding the limit of its transfer capacity.

In a step S1505 following the step S1504 wherein the printer section 113 starts the printing process, the CPU 103 determines whether or not the printing process is completed.

If the printing process is not completed, the CPU 103 repeats the determination in the step S1505.

If the printing process is completed, in a step S1506, the CPU 103 determines whether or not the scanning process is being executed.

If the scanning process is not being executed, i.e. has been terminated, the CPU 103 terminates the process in FIG. 15.

If the scanning process is being executed, in a step S1507, the CPU 103 displays a return-to-normal scanning mode-setting screen for setting whether or not to return the scanning speed to the original high speed, on the LCD touch panel of the console section 114.

Figure 16:
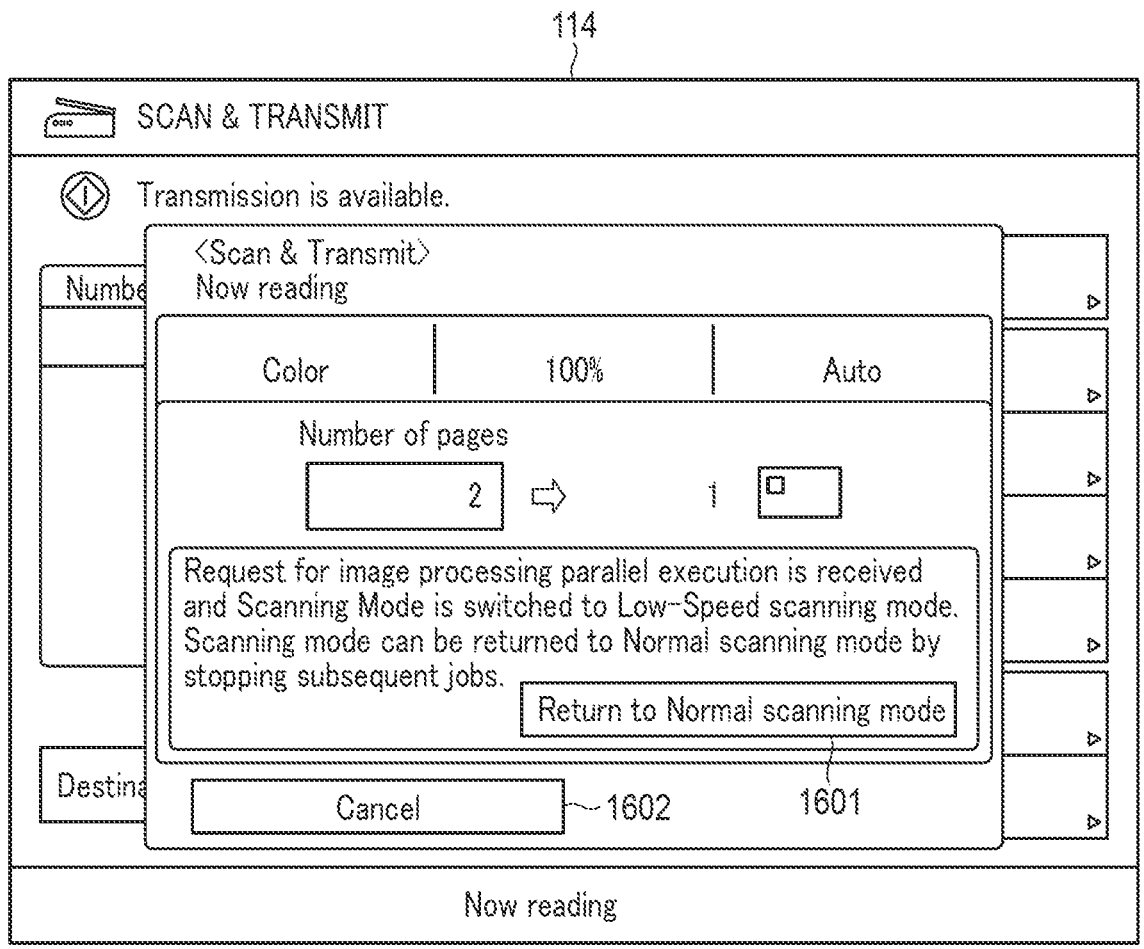
FIG. 16 is a view showing an example of a return-to-normal scanning mode-setting screen displayed on the LCD touch panel of the console section.

FIG. 16 is a view showing an example of the return-to-normal scanning mode-setting screen displayed on the LCD touch panel of the console section 114.

On the setting screen shown in FIG. 16, a button 1601 for returning the scanning mode to the normal scanning mode, i.e. the high-speed scanning mode and a button 1602 for canceling returning the scanning mode to the high-speed scanning mode are selectively displayed together with a notification to the effect that "the scanning mode has been switched to the low-speed scanning mode".

The user operates one of the selection buttons.

In a step S1508, the CPU 103 acquires a setting signal output from the console section 114 based on a user's operation.

In a step S1509, the CPU 103 determines whether or not returning the scanning mode to the normal scanning mode, i.e. the high-speed scanning mode, has been selected.

If returning the scanning mode to the high-speed scanning mode has not been selected, the CPU 103 proceeds to a step S1511.

If returning the scanning mode to the high-speed scanning mode has been selected, in a step S1510, the CPU 103 notifies the scanner section 112 and the JO section 109 that the operation of the scanning process in the single transfer mode is to be started.

The IO section 109 sets the transfer enable clock signal by switching the frequency thereof to the high frequency for high-speed transfer. The clock controller 303 of the scanner section 112 changes the clock signal of the scanner section 112 according to the transfer enable clock signal.

The scanner section 112 continues the scanning process while transferring image data in synchronism with the transfer enable clock signal with the high frequency for high-speed transfer. The image bus 110 can transfer the image data without exceeding the limit of its transfer capacity.

In the step S1511, the CPU 103 determines whether or not the scanning process has been terminated.

If the scanning process has not been terminated, the CPU 103 repeats the determination on termination of the scanning process in the step S1511.

If the scanning process has been terminated, the CPU 103 terminates the process in FIG. 15.

As described above, in the present embodiment, in a case where starting the scanning process results in a state of execution thereof in parallel with any other process(es), the LCD touch panel of the console section 114 displays the setting screen (low-speed scanning execution permission/inhibition-setting screen) related to the transfer rate of data from the scanner section 112 to the image memory. The CPU 103 sets the data transfer rate by switching the same based on a user's operation performed on the setting screen in the displayed state. Further, in a case where when starting any other process(es) results in a state of execution thereof in parallel with the scanning process, the LCD touch panel of the console section 114 displays the setting screen (return-to-normal scanning mode-setting screen) related to the transfer rate of data from the scanner section 112 to the image memory. The CPU 103 sets the data transfer rate by switching the same based on a user's operation performed on the setting screen in the displayed state. Therefore, when starting a new process, the multifunction peripheral 100 can set the data transfer rate by switching the same based on the user's operation.

In the above-described embodiments, in a case where the frequency of the transfer enable clock signal is changed, the scanner section 112 immediately changes the frequency of the reading clock signal according to the notification received from the CPU 103.

With this, the reading clock signal is immediately synchronized with the transfer enable clock signal on the image bus 110.

Further, for example, after receiving the notification from the CPU 103, the scanner section 112 may change the frequency of the reading clock signal when the scanner RAM 302 is filled with image data which has not been transferred yet.

Figure 17A:
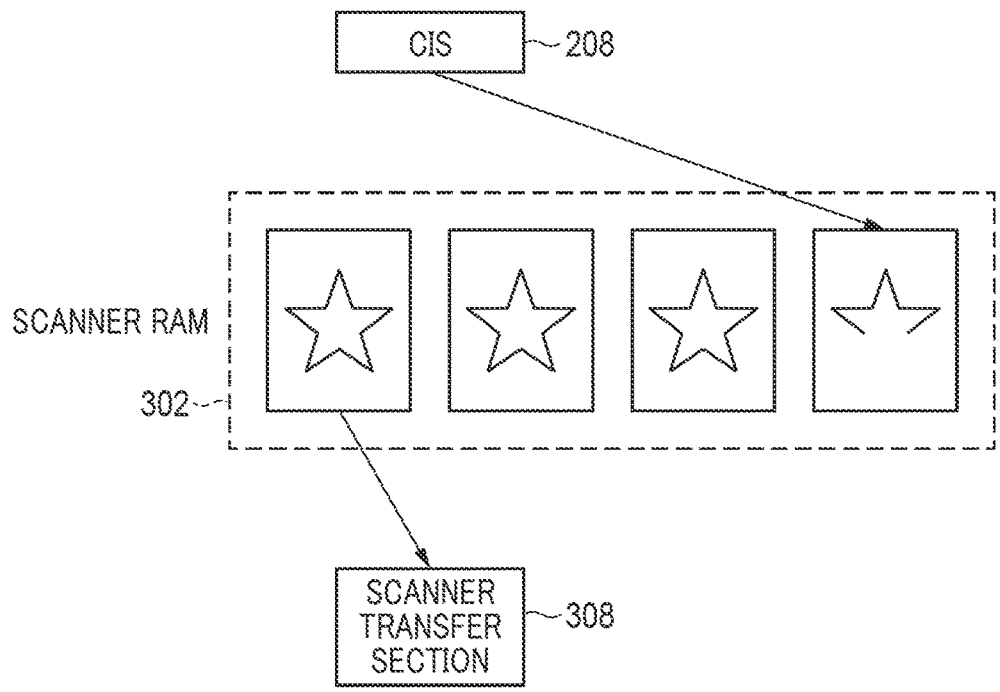
FIGS. 17A and 17B are views useful in explaining timing in which the scanner RAM is filled with image data which has not been transferred.
Figure 17B:
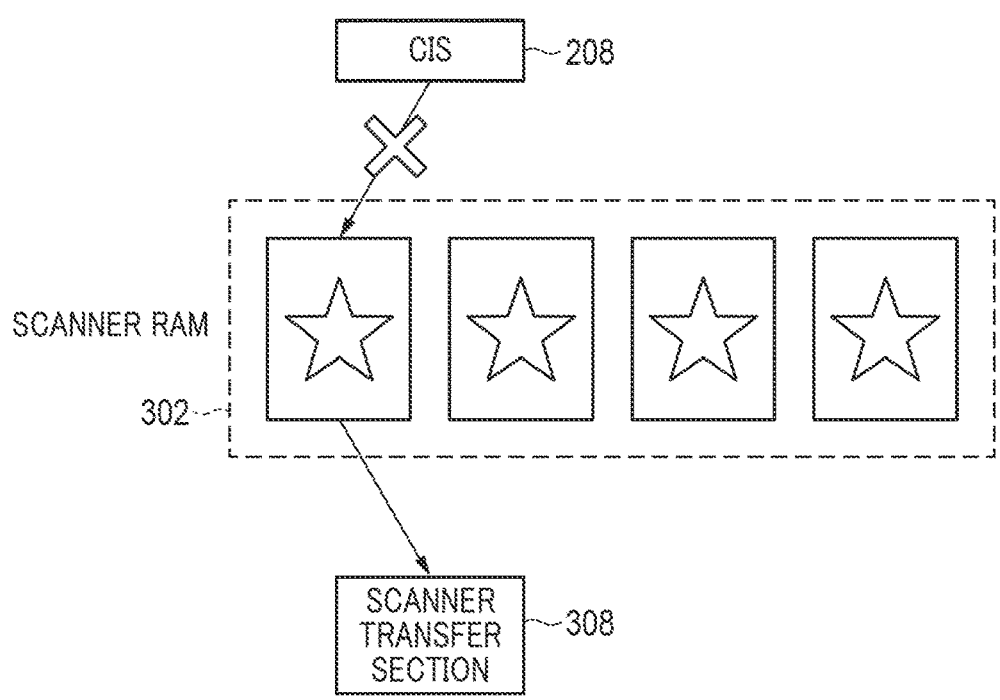

FIGS. 17A and 17B are views useful in explaining the timing in which the scanner RAM 302 is filled with image data which has not been transferred.

In the timing shown in FIG. 17A, the CIS 208 is recording unprocessed image data of a fourth sheet in the scanner RAM 302 which is capable of recording four sheets of image data. On the other hand, the scanner transfer section 308 is transferring image data of a first sheet from the scanner RAM 302.

After that, in the timing shown in FIG. 17B, while the scanner transfer section 308 is transferring the image data of the first sheet from the scanner RAM 302, the CIS 208 is about to record unprocessed image data of a fifth sheet in the scanner RAM 302, but has not started recording yet.

Assuming a case where the scanner section 112 operates according to the reading clock signal with a high frequency even after the transfer enable clock signal on the image bus 110 has been changed to the low frequency, the scanner RAM 302 is brought into the state shown in FIG. 17B.

In this case, the scanner section 112 is only required to change the frequency of the reading clock signal in the timing shown in FIG. 17A or 17B.

Alternatively, the scanner section 112 may stop the reading clock signal in the timing shown in FIG. 17A or 17B, and restart the reading clock signal when a free area is generated in the scanner RAM 302.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-131634 filed Jul. 11, 2018, which is hereby incorporated by reference herein in its entirety.

What is claimed is:

1. An image processing apparatus that has a scanner unit configured to perform a scanning process for scanning a document and generating image data, and a controller unit having a memory unit configured to store the image data generated by the scanning process, comprising:
   a transfer unit configured to transfer the image data from the scanner unit to the memory unit via an image bus;
   a setting unit configured to set a transfer rate of the image data by the transfer unit to at least a first transfer rate or a second transfer rate lower than the first transfer rate; and
   a user interface unit configured to receive a setting of whether to set the transfer rate to the second transfer rate in a case where a predetermined process which uses the image bus is being executed when the scanning process is started,
   wherein the setting unit sets the transfer rate of the image data to the first transfer rate in a case where the predetermined process which uses the image bus is not being executed when the scanning process is started, and
   wherein the setting unit sets the transfer rate of the image data based on the setting received by the user interface unit in a case where the predetermined process which uses the image bus is being executed when the scanning process is started.

2. The image processing apparatus according to claim 1, wherein the setting unit sets the transfer rate of the image data to the second transfer rate in a case where (i) the user interface unit receives a setting to set the transfer rate to the second transfer rate in the case where the predetermined process which uses the image bus is being executed when the scanning process is started and (ii) the predetermined process which uses the image bus is being executed when the scanning process is started, and
   wherein the setting unit sets the transfer rate of the image data to the first transfer rate and execution of the predetermined process is suspended in a case where (iii) the user interface unit receives a setting not to set the transfer rate to the second transfer rate in the case where the predetermined process which uses the image bus is being executed when the scanning process is started and (ii) the predetermined process which uses the image bus is being executed when the scanning process is started.

3. The image processing apparatus according to claim 1, further comprising a printing unit,
   wherein the predetermined process is a printing process by the printing unit.

4. The image processing apparatus according to claim 1, further comprising a printing unit,
   wherein the setting unit sets the transfer rate of the image data to the first transfer rate in a case where another predetermined process is being executed when the scanning process is started.

5. The image processing apparatus according to claim 4, further comprising a network interface unit,
   wherein the another predetermined process is a transmitting process for transmitting the image data via the network interface unit.

6. The image processing apparatus multifunction peripheral according to claim 4, further comprising a facsimile transmitting unit,
   wherein the another predetermined process is a facsimile transmitting process for transmitting the image data via the facsimile transmitting unit.

7. The image processing apparatus according to claim 1, wherein the setting unit sets a transfer rate of the image data by the transfer unit to at least the first transfer rate or the second transfer rate by setting a frequency of a transfer enabling clock to a first frequency or a second frequency which is lower than the first frequency.

8. The image processing apparatus according to claim 1, further comprising a printing unit,
   wherein the printing unit performs printing based on the image data read out from the memory unit.

9. The image processing apparatus according to claim 1, further comprising a printing unit,
   wherein the printing unit performs printing based on the image data read out via the image bus from the memory unit.

10. The image processing apparatus according to claim 1, further comprising an image processing unit,
    wherein the image processing unit performs image processing to the image data read out via the image bus from the memory unit.

11. A method of controlling an image processing apparatus that has a scanner unit configured to perform a scanning process for scanning a document and generating image data, and a controller unit having a memory unit configured to store the image data generated by the scanning process, the method comprising:
    transferring the image data generated by the scanner unit to the memory unit via an image bus;
    setting a transfer rate of the image data from the scanner unit to the memory unit to at least a first transfer rate or a second transfer rate lower than the first transfer rate;
    receiving a setting of whether to set the transfer rate to the second transfer rate in a case where a predetermined process which uses the image bus is being executed when the scanning process is started;
    setting the transfer rate of the image data to the first transfer rate in a case where the predetermined process which uses the image bus is not being executed when the scanning process is started; and
    setting the transfer rate of the image data based on the received setting in a case where the predetermined process which uses the image bus is being executed when the scanning process is started.

12. A non-transitory computer-readable storage medium storing a computer-executable program for executing a method of controlling an image processing apparatus that has a scanner unit configured to perform a scanning process for scanning a document and generating image data, and a controller unit having a memory unit configured to store the image data generated by the scanning process, wherein the method comprises:
transferring the image data generated by the scanner unit to the memory unit via an image bus;
setting a transfer rate of the image data from the scanner unit to the memory unit to at least a first transfer rate or a second transfer rate lower than the first transfer rate;
receiving a setting of whether to set the transfer rate to the second transfer rate in a case where a predetermined process which uses the image bus is being executed when the scanning process is started;
setting the transfer rate of the image data to the first transfer rate in a case where the predetermined process which uses the image bus is not being executed when the scanning process is started; and
setting the transfer rate of the image data based on the received setting in a case where the predetermined process which uses the image bus is being executed when the scanning process is started.

* * * * *